United States Patent [19]

Russell et al.

[11] Patent Number: 5,482,996

[45] Date of Patent: Jan. 9, 1996

[54] PROTEIN-CONTAINING POLYMERS AND A METHOD OF SYNTHESIS OF PROTEIN-CONTAINING POLYMERS IN ORGANIC SOLVENTS

[75] Inventors: Alan J. Russell, Wexford; Eric J. Beckman, Edgewood, both of Pa.

[73] Assignee: University of Pittsburgh, Pittsburgh, Pa.

[21] Appl. No.: 165,712

[22] Filed: Dec. 8, 1993

[51] Int. Cl.$^6$ ............................. C08L 89/00; C08G 63/48
[52] U.S. Cl. .................. 525/54.1; 525/54.11; 526/238.1
[58] Field of Search ............................. 525/54.1, 54.11; 526/238.1; 527/200, 201, 202, 203, 204, 205, 206, 207

[56] References Cited

U.S. PATENT DOCUMENTS

| | | | |
|---|---|---|---|
| 3,969,287 | 7/1976 | Jaworek et al. | 526/238.1 |
| 4,609,707 | 9/1986 | Nowinski et al. | 525/54.1 |
| 5,122,614 | 6/1992 | Zapipsky . | |
| 5,219,564 | 6/1993 | Zalipsky et al. . | |

OTHER PUBLICATIONS

Alan J. Russell, Darrell L. Williams, Jr. and Eric J. Beckman, Abstract, Nov. 16, 1992.

Valerie Fulcrand, Robert Jacquier, Rene Lazaro and Philippe Viellefont, "New Biocatalysts for Peptide Synthesis: Gels of Copolymerized Acrylic Derivatives of α-Chymotrypsin and Polyoxyethylene" Tetrahedron vol. 46, No. 11, pp. 3909–3920, 1990, Printed in Great Britain.

T. Yoshimoto, A. Ritani, K. Ohwada, K. Takahashi, Y. Kodera, A. Matsushima, Y. Saito and Y. Inada, "Polyethylene Glycol Derivative–Modified Cholesterol Oxidase Soluble and Active in Benzene," Biochemical and Biophysical Research Communications, vol. 148, No. 2, Oct. 29, 1987, pp. 876–882, Tokyo, Japan, Academic Press, Inc.

Yuji Inada, Hiroyuki Nishimura, Katsunobu Takahashi, Takayuki Yoshimoto, Anutosh Ranjan Saha and Yuji Saito, "Ester Synthesis Catalyzed by Polyethylene Glycol–Modified Lipase in Benzene," Biochemical and Biophysical Research Communications, vol. 122, No. 2, Jul. 31, 1984, pp. 845–850, Tokyo, Japan, Academic Press, Inc.

Petra Wirth, Jerome Souppe, Denis Tritsch and Jean–Francois Biellmann, "Chemical Modification of Horseradish Peroxidase with Ethanal–Methoypolyethylene Glycol: Solubility in Organic Solvents, Activity and Properties," Bioorganic Chemistry 19, 1991, Received Jul. 26, 1990, pp. 133–142, Artix France, Academic Press, Inc.

Valerie Fulcrand, Robert Jacquier, Rene Lazaro and Philippe Viallfont, "Enzymatic Peptide Synthesis in Organic Solvent Mediated by Gels of Copolymerized Acrylic Derivatives of α–Chymotrypsin and Polyoxyethylene," Int. J. Peptide Protein Res. 38, 1991, Received Dec. 20, 1990, accepted for publication Apr. 29, 1991, pp. 273–277, Cedex, France.

Yuji Indada, Katsunobu Takahashi, Takayuki Yoshimoto, Ayako Ajima, Ayako Matsushima and Yuji Saito, "Application of Polyethylene Glycol–Modified Enzymes in Biotechnological Processes: Organic Solvent–Soluble Enzymes," Tibtech, Jul. 1986, Laboratory of Biological Chemistry, Tokyo Institute of Technology Ookayama, Meguoku, Tokyo 152, Japan.

Yuji Inada, Katsunobu Takahashi, Takayuki Yoshimoto, Yoh Kodera, Ayako Matsushima and Yuji Saito, "Application of Peg–Enzyme and Magnetite–Peg–Enzyme Conjugates for Biotechnological Processes," Eiseview Publications, Cambridge, 1988, Laboratory of Biological Chemistry, Tokyo Institue of Technology, Ookayama, Meguro–ku, Tokyo 152, Japan.

Primary Examiner—Nathan M. Nutter
Attorney, Agent, or Firm—Reed Smith Shaw & McClay

[57] ABSTRACT

The present invention provides protein-containing polymers and a general method of incorporating biologically active proteins into a polymer matrix via copolymerization in organic solvents. Preferably, the protein is an active enzyme which maintains its activity in the polymeric matrix. The proteins are first solubilized in organic solvents by covalent attachment of a modifying moiety such as a polyalkylene oxide. The polyalkylene oxide is functionalized with a functional group enabling copolymerization in organic solvents with an organic-soluble comonomer.

35 Claims, 25 Drawing Sheets

+ (a), (b), (c), (d) from figure 9a

PROTEIN-CONTAINING POLYMERS AND A METHOD OF SYNTHESIS OF PROTEIN-CONTAINING POLYMERS IN ORGANIC SOLVENTS

FIELD OF THE INVENTION

The present invention relates to protein-containing polymers and a method of synthesizing such protein-containing polymers and especially to enzyme-containing polymers synthesized in organic solvents.

BACKGROUND OF THE INVENTION

Enzymatic proteins are remarkable natural catalysts in that they selectively perform a myriad of reactions under relatively mild conditions. Enzymes also offer the possibility of stereo-, regio- and other selectivities for the formation of novel chemicals for drugs, food additives, agricultural chemicals and other products.

Although the use of enzymes is commonly associated with aqueous chemistry, recent work demonstrates that enzymes are both active and resilient in organic media, allowing a far greater range of substrates to be examined in conjunction with a particular protein. If the substrate is insoluble or only slightly soluble in water, the maximum activity of the enzyme cannot be achieved in an aqueous solution. The study of enzyme activity in non-aqueous media is thus motivated principally by the need to extend the applicability of enzymes to the catalysis of reactions whose reactants and/or products are not water-soluble, as are many medically and industrially important reactions.

Other factors also make non-aqueous enzymology attractive. For example, the absence of water in some cases can prevent undesirable side reactions. It has also been shown that reduced water content improves the thermostability of many enzymes.

Many enzymes can function efficiently, maintaining their structure, mechanism, specificity, and stability, when suspended as lyophilized powders in a variety of anhydrous organic solvents. For enzyme reactions which do not utilize water as a reactant, such as alcohol dehydrogenases or dehalogenases, the specific activity of the enzyme can rival those solubilized in more conventional surroundings. The dependence of enzyme structure and function on solvent physical properties is currently under intensive study in many laboratories around the world. However, for those enzymes which require water as a reactant, a compromise must be found in which the enzyme has access to essential water, while the substrate can be solubilized in the organic solvent of choice.

The use of biphasic mixtures of aqueous and organic phases has been suggested by several researchers. In these systems, the enzyme is contained within the aqueous phase and the substrate is introduced in the organic phase. While this approach enables a higher substrate concentration as well as offering a convenient method for product removal via the organic phase, several disadvantages are associated with it. Because of the low solubility of the substrates in the aqueous phase where the enzyme is located, very high concentrations of the substrate (on the order of moles/liter) are necessary to enhance the product formation. The use of very low volumes of the water phase can achieve the same result. The use of these systems for preparative chemistry has been described.

Another route to achieving some of the advantages of non-aqueous enzymology while maintaining the aqueous environment around the enzyme is the use of reversed micelles, which are spherical aggregates of amphiphilic molecules in an organic solvent encapsulating a water pool.

A further recent trend in biotechnology involves the use of modified enzymes which are soluble and active in organic solvents. Recent work has shown that one can covalently functionalize an enzyme with an amphiphilic polymer such as polyethylene glycol (PEG), thus allowing the enzyme adduct to dissolve in an organic solvent while maintaining activity. The covalent attachment can be accomplished by linkage of the ε-amino groups of lysine residues to derivatives of PEG. The resulting PEG-modified enzymes are soluble to concentrations of a few mg/ml in a number of organic solvents. The homogenous PEG-enzyme system resulting in enzyme (protein) solubilization is not limited by diffusion, and enables the enzyme to retain high activity.

Most of the recent studies of enzyme behavior in organic media employ conventional liquid solvents, yet some new and intriguing applications may become possible if one could tether an enzyme to an organic polymer. Indeed, the covalent attachment of proteins, including enzymes, to polymers has been the subject of intensive research for many decades. Immobilized proteins have been used in the food, chemical, pharmaceutical, and agricultural industries. Nevertheless, the variety of polymers which can serve as suitable hosts for biological activity are limited by the conditions under which proteins are typically incorporated into polymers. The predominant reason for this apparent limitation is related to the sensitivity of most proteins to their environment. For instance, a protein which is unstable at pH 9.0 is unlikely to be successfully immobilized using a strategy which is dependent on alkaline pH's during attachment.

Further, the development of a wide variety of classes of protein-containing polymers depends not only on the availability of immobilization strategies, but also on the stability of proteins in environments which are best suited to rational polymer design. The potential application of biomaterials would be enhanced by redirecting the focus on choosing a given set of polymer properties, and having a general method for incorporating a protein in the favored polymer matrix.

It is an object of the present invention to provide a general method for synthesizing novel protein-containing polymers in which biological activity is retained in both aqueous and non-aqueous environments as well as mixtures thereof.

SUMMARY OF THE INVENTION

Accordingly the present invention provides protein-containing polymers and a general method of incorporating biologically active proteins into a polymer matrix via copolymerization in organic solvents. Preferably, the protein is an active enzyme which maintains its activity in the polymeric matrix.

Generally, the present invention provides a water-insoluble copolymer comprising a biologically active protein covalently attached to at least one modifying moiety. The modifying moiety is selected to enable solubilization of the modified protein in an organic solvent while maintaining biological activity of the protein. The modifying moiety is covalently attached to at least one organic-soluble comonomer selected to polymerize with modifying moiety in the organic solvent.

The present invention also generally comprises a method of synthesizing a copolymer incorporating a biologically active protein (preferably an active enzyme) comprising the step of reacting at least one organic-soluble comonomer with a modified protein in an organic solvent. The modified protein comprises a protein covalently attached to a modifying moiety selected to enable solubilization of the modified protein in the organic solvent. The modifying moiety is appropriately functionalized to react with the water-insoluble comonomer. The modifying moiety may be functionalized either with a vinyl functional group to effect a free-radical addition polymerization or with a functional group such as NH selected to effect a condensation polymerization.

Vinyl-functionalized, modified proteins can be incorporated into virtually any vinyl polymeric matrix under the present invention. For example, vinyl-functionalized modified proteins may be incorporated into vinyl polymers incorporating the following organic-soluble, vinyl comonomers: methyl methacrylate, methyl acrylate, butyl methacrylate, hydroxy ethyl methacrylate, styrene, alpha-methyl styrene, vinyl chloride, vinyl acetate, vinyl pyrollidone or combinations thereof. Preferably, the following organic-soluble, vinyl comonomers are used: methyl methacrylate, methyl acrylate, butyl methacrylate or hydroxy ethyl methacrylate.

A number of organic solvents are suitable for the polymerization including chloroform, tetrahydrofuran, methanol, carbon tetrachloride, methylene chloride, toluene benzene, alkanes, fluoroform, dioxanes, ethanol, dimethyl formamide, diethyl ether and carbon dioxide. The reaction temperature may be in the range of approximately 0° to 100° C. Preferable the reaction temperature is in the range of approximately 50° to 60° C. Free radical initiators including azo compounds and peroxides of the following general formulas may be used.

or

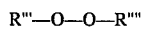

A preferred initiator is azo bis(isobutyronitrile) (AIBN). The polymerization reaction may proceed with or without ultraviolet radiation. At temperatures below 20° C., ultraviolet radiation may be necessary, however.

As set forth above, the modified protein may be appropriately functionalized to enable incorporation of the modified protein into a polymer matrix via a condensation polymerization. The functional group of the modified protein may be, among others, an amino group, a hydroxyl group or a carboxyl group. Condensation copolymers including polyamides, polyesters, polyureas and polyurethanes can be produced.

Although proteins including enzymes have been immobilized on a variety of hydrophilic supports, including glass beads and hydrogels, via conventional aqueous chemistry, the fixation of enzymes in a substantially hydrophobic matrix during polymerization has not previously been disclosed. An important distinction exists between the present invention and more conventional approaches to forming protein containing polymers. In the present invention, it is not intended to synthesize a hydrogel by cross-linking acrylic groups attached to the proteins as others have described previously. See e.g., Fulcrand, V., Jacquier, R., Lazaro, R., and Viallefont, P., *Int. J. Peptide Protein Res.,* "Enzymatic Peptide Synthesis in Organic Solvents Mediated by Gels of Copolymerized Acrylic Derivatives of Chymotrypsin and Polyoxyethylene," 38, 273–277 (1991). Instead the present invention incorporates a protein (preferably at low weight percent) into a polymer thereby preserving some of the gross properties of the polymer and the enzyme. Further, the incorporation step itself takes place in non-aqueous media, greatly expanding the range of polymers which can be synthesized. The present invention thus sets forth a general strategy for incorporating any protein into a substantially hydrophobic polymer matrix such as into polyacrylic beads, discs, and membranes.

Preferably, the modifying moiety of the present invention comprises a polyalkylene oxide derivative such as a PEG derivative. Enzymes (proteins) which have been covalently modified with a polyethylene glycol derivative can be solubilized in a variety of organic solvents.

Of course any modifying moiety capable of producing a modified protein soluble in organic solvents can be used. Preferably, the biological activity of the protein is maintained after modification. Styrene is another example of such a protein modifying moiety. Preferably, the molecular weight of the modifying moiety is in the range of approximately 200 to 10,000. When a relatively low molecular weight modifying moiety is used, it may be necessary to modify a protein chain with multiple molecules of the modifying moiety to effect organic solubilization of the protein chain.

In a preferred embodiment of the present invention, a functionalized polyethylene glycol (i.e., one which has a monomeric functional group, preferably at one end) is used to modify an enzyme. The resulting "bio-monomer" is soluble and active in water, organic solvents, and mixtures of the two. The protein co-monomer can be incorporated into a co-polymer, at any given weight percent, during a polymerization in the presence of a solvent or solvents necessary to synthesize a polymer of desired properties.

The weight percent of the modified protein can vary between 0 and the solubility limit of the modified protein in the organic solvent. Maintaining the protein at low weight percent however will result in polymers which have substantially the same properties as those in the absence of proteins. Preferably, the weight percent of the modified protein is less than or equal to approximately 5%. Most preferably, the weight present of the modified protein is less than or equal to approximately 2%. Incorporation of relatively low amounts of protein into a polymer matrix enables the physical properties of a polymer to be selected prior to immobilization of the protein. Materials with high porosities or other morphologies can thereby be synthesized with active protein contained within the material.

A commonly-used strategy for tuning the physical properties of polymers is to vary the proportion of solvent and non-solvent in the polymerization reaction mixture. The ability of the protein to both withstand the solvents utilized, and to also be used as a co-monomer, enables the synthesis of many different types of protein containing polymers (for instance, beads, fibers, and membranes) from the same starting materials. The resulting polymers will have properties which are most useful for a given application, and will also contain active biological molecules.

The incorporation of proteins into polyacrylates is a model system under the present invention. Acrylic polymers can be synthesized from, for example, methyl methacrylate in organic solvents. By varying the ratio of solvent (e.g., chloroform) and non-solvent (e.g., carbon tetrachloride) during polymerization polymers of varying molecular weight, porosities, and other properties can be synthesized. Thus, by tethering an enzyme to an acrylate-terminated PEG, one can incorporate the biocatalyst into an organic polymer through free-radical chemistry.

Applications of protein-containing polymers such as stabilization of antibodies for affinity supports in affinity chromotography, enzymatic extraction/degradation of toxic compounds, as well as production of biosensors for organic materials and selective, reactive membranes are now feasible in that the present invention demonstrates that proteins, including enzymes, can be immobilized by incorporation into a matrix of substantially hydrophobic organic polymers while retaining biological activity.

The present invention is also ideally suited to stabilize proteins for a variety of uses including novel enzymatic reactor systems. A particularly useful application may be the stabilization of proteins capable of synthesizing peptide bonds (e.g., the stabilization of thermolysin which is used to catalyze the synthesis of an aspartame precursor).

In any enzymatic application, the choice of substrate/reaction pair will determine both the choice of polymer and the enzyme. Regarding the former, the substrate must partition from the bulk phase (either organic or aqueous or a mixture thereof) into the polymer, and thus the thermodynamics of mixing between substrate and polymer must be understood. The identity of the substrate will limit the choice of enzyme to those which exhibit high activity and good selectivity towards the compound.

The ability to employ a resilient, highly selective biocatalyst on substantially hydrophobic organic substrates is key. For example, asymmetric polymeric membranes have the potential to be useful tools in the removal of trace organics from aqueous effluent streams. Polymeric membranes have shown promise in the reverse osmosis of organic contaminants from aqueous solution. Unlike activated carbon and analogous materials, membranes do not require regeneration, and thus represent low-maintenance alternatives to sorbents for continuous organic/water separation. Despite these favorable attributes, significant technical hurdles remain before membrane systems for organic/water separations achieve widespread use. Specifically, the high osmotic pressure which must be overcome during organic/aqueous separation use of membranes impractical in many makes the such situations. Pervaporation, the active removal of the permeant from the downstream side of the membrane, has been proposed as the best means by which to overcome the osmotic pressure difference, despite the energy input this entails. However, use of elevated downstream temperature or reduced downstream pressure can severely test the durability of a membrane material.

By generating reactive membranes which incorporate covalently-bound enzymes within the organic polymer matrix, one could conceivably add the advantages of pervaporation while lowering energy input and reducing stress on the membrane.

Further applications of the present invention include development of chromatography supports for enantiomeric separations and catalyst particles for use in fluidized beds. Each of these applications hinges on the combination of selective and active biocatalyst bound to a durable organic matrix.

DETAILED DESCRIPTION OF THE INVENTION

Figure 1:
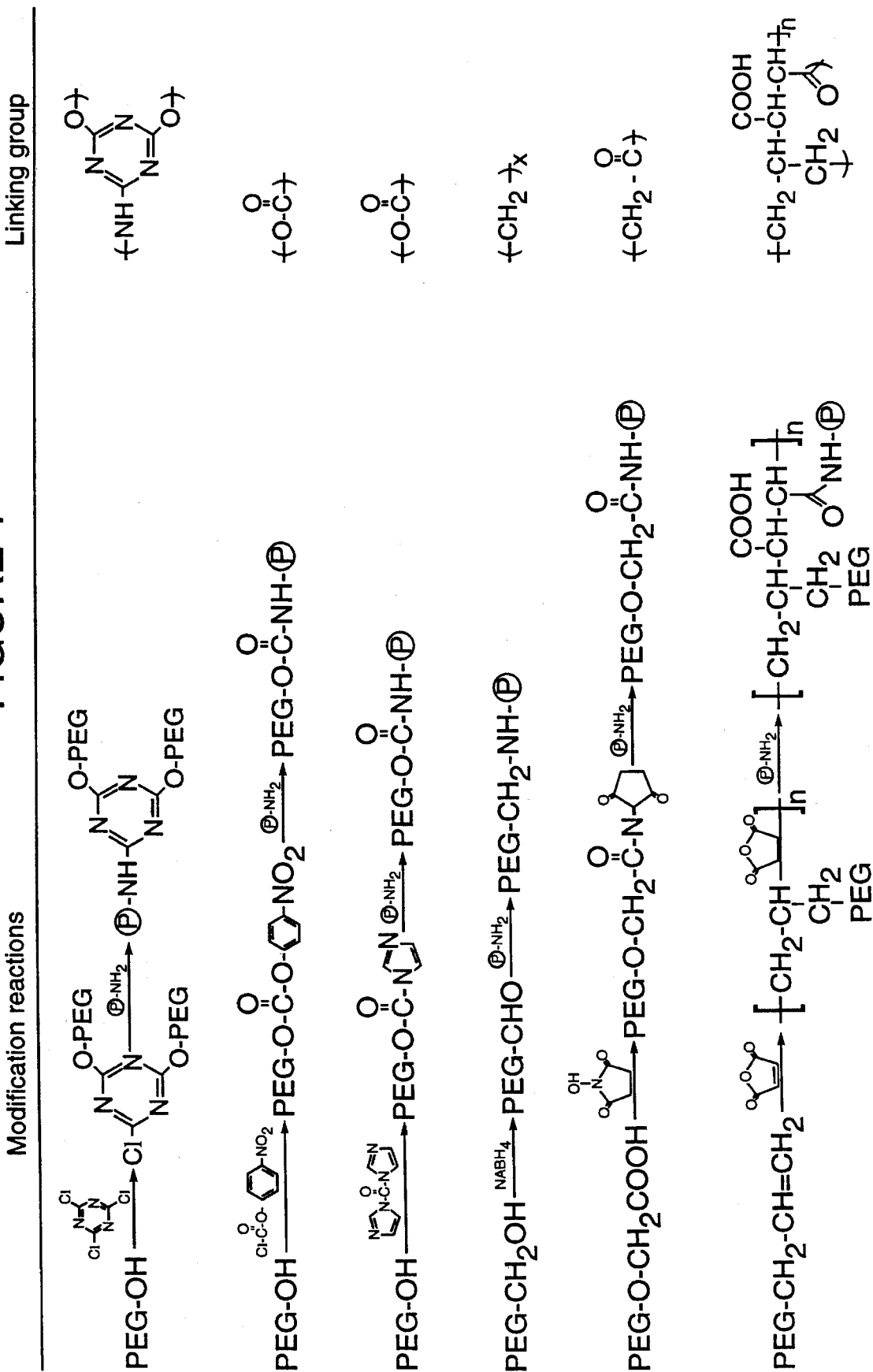
FIG. 1 is an illustration of a number of methods for the modification of a protein.
Figure 2A:
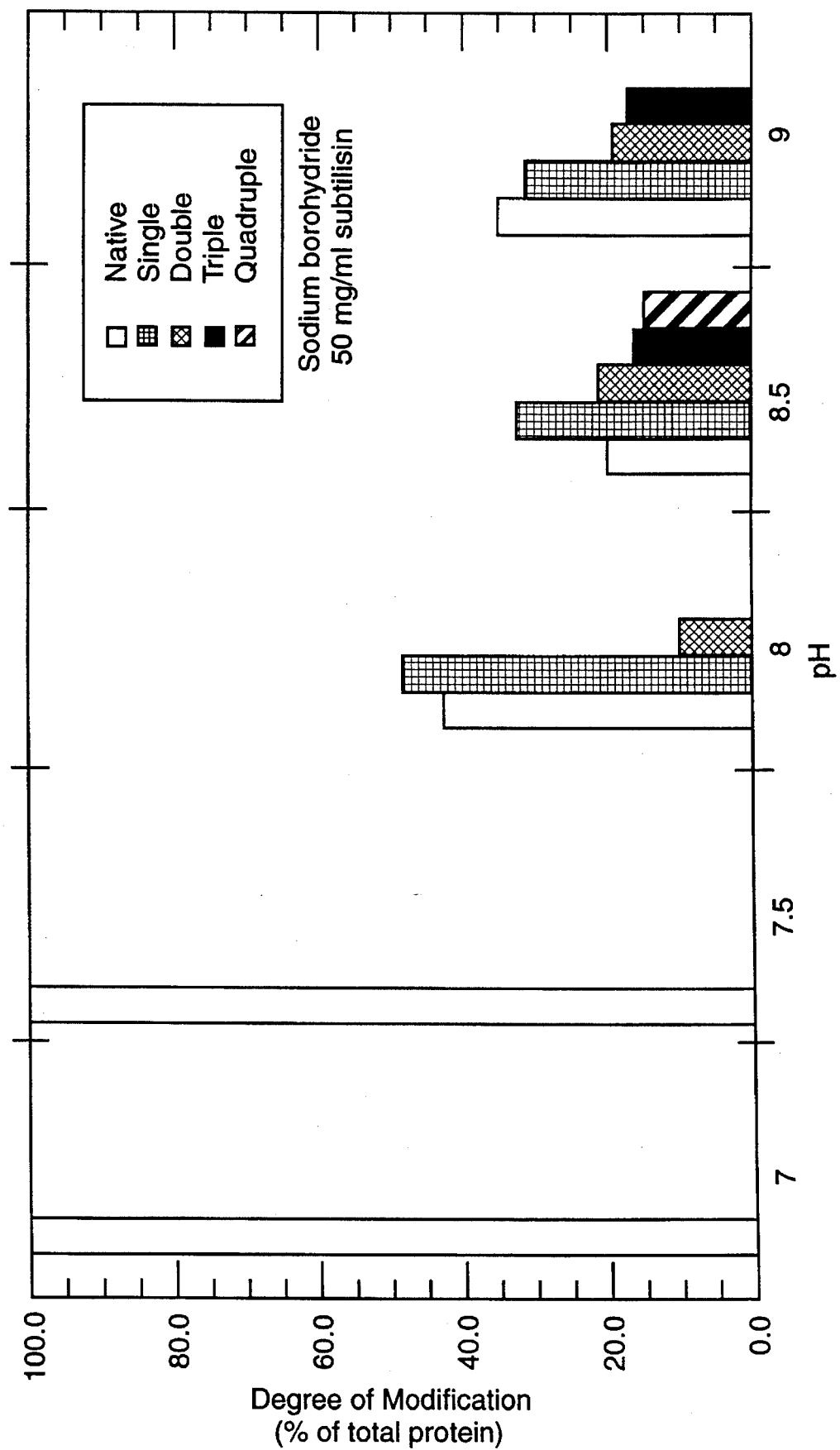
FIG. 2a is an illustration of the effect of pH upon the extent of modification for the addition of PEG-aldehyde to subtilisin in sodium cyanoborohydride.
Figure 2B:
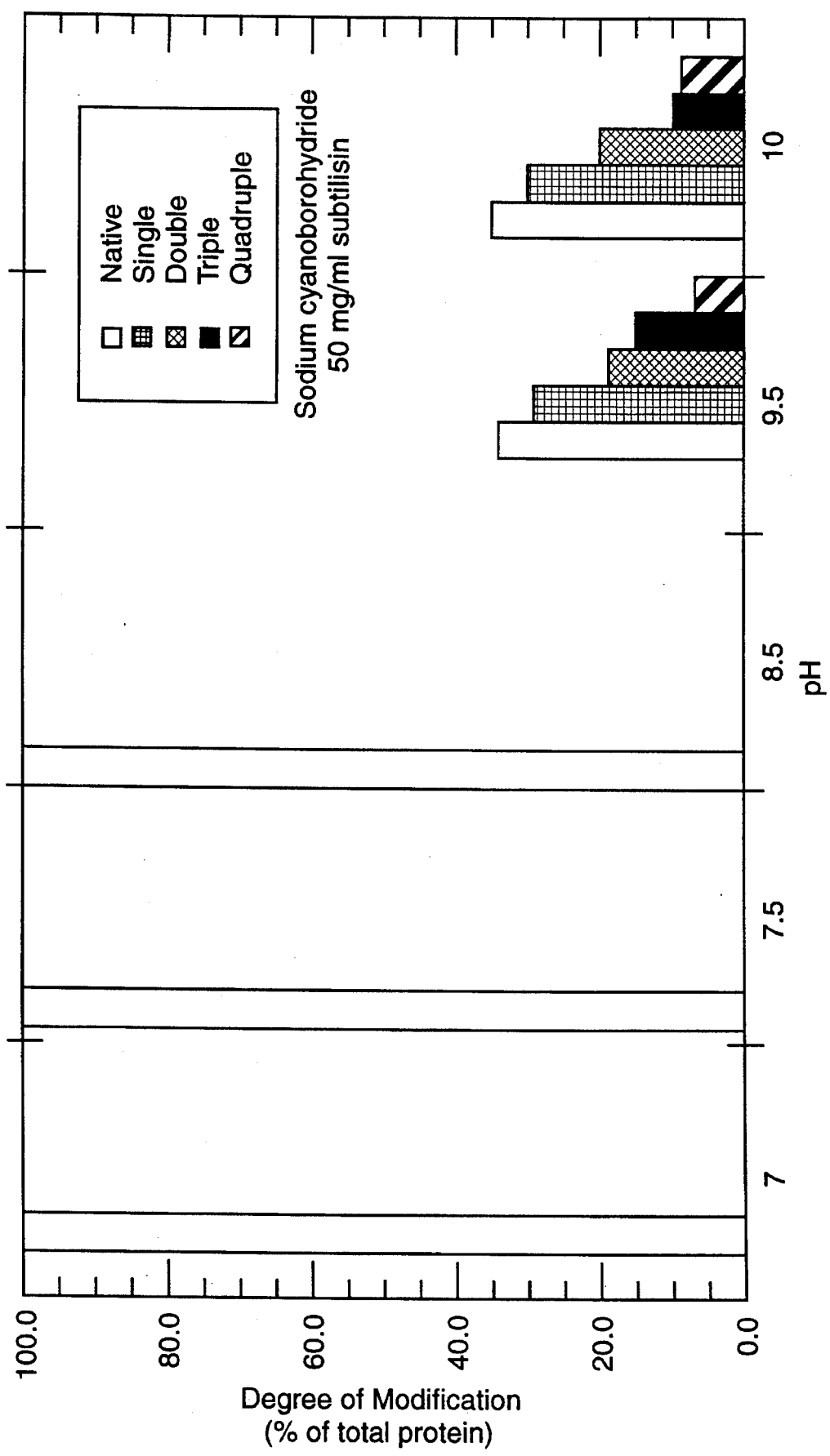
FIG. 2b is an illustration of the effect of pH upon the extent of modification for the addition of PEG-aldehyde to subtilisin in sodium borohydride.
Figure 2C:
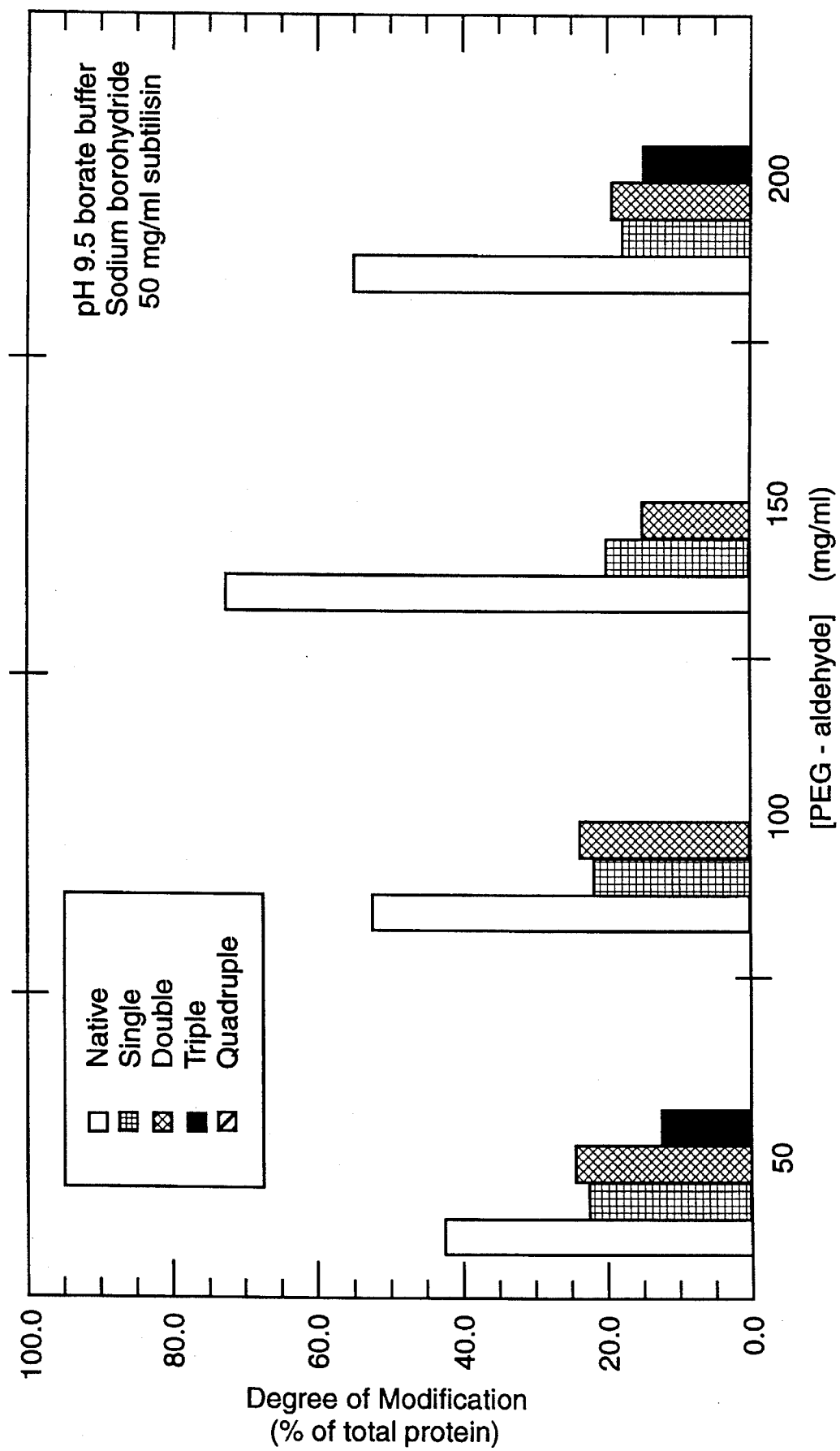
FIG. 2c is an illustration of the effect of PEG-aldehyde concentration upon the extent of modification.
Figure 2D:
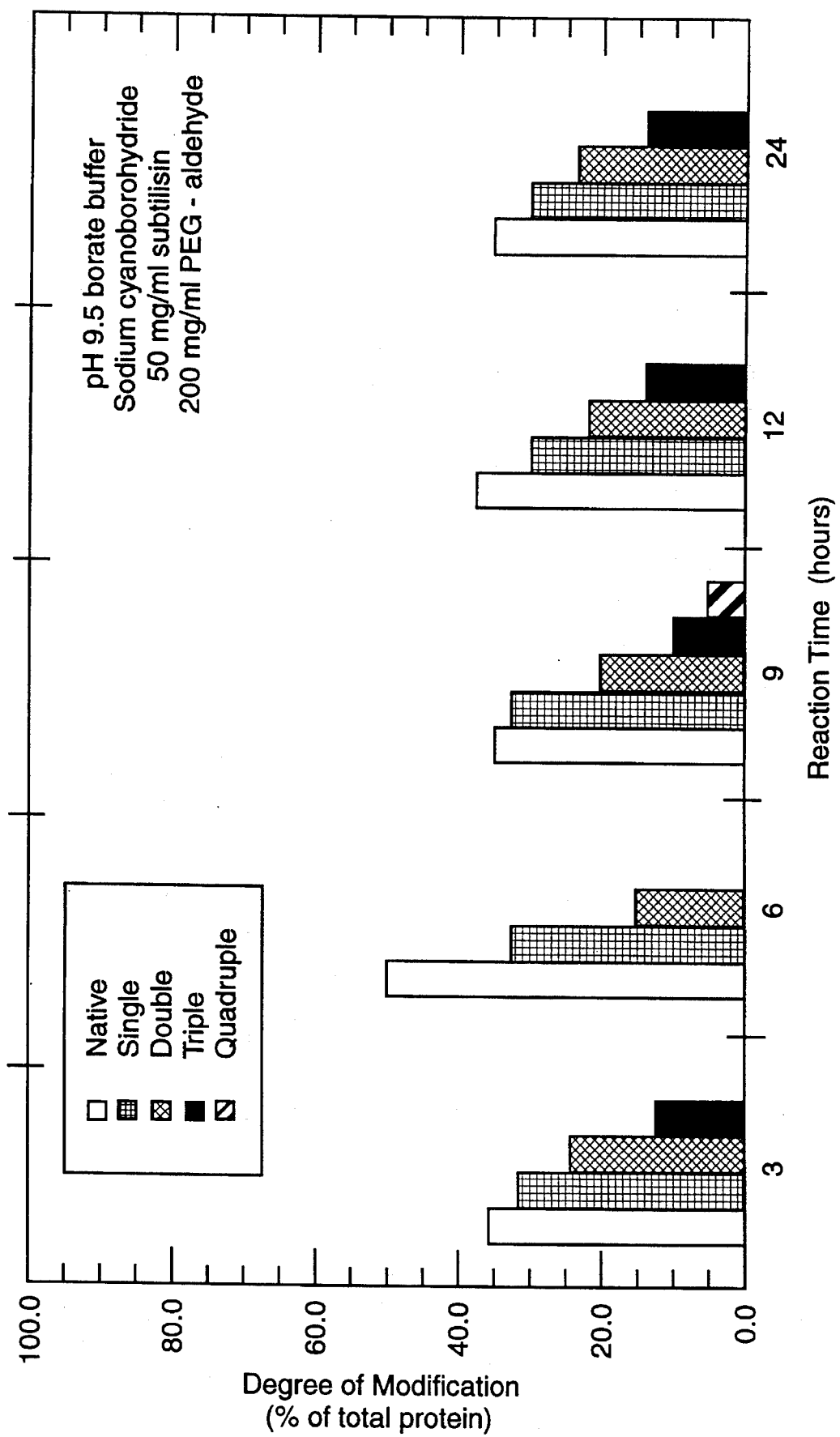
FIG. 2d is an illustration of the effect of reaction time upon the extent of modification.

Virtually any protein can be incorporated into a polymeric matrix during polymerization in an organic solvent under the present invention. For example, the following proteins (enzymes) are easily modified with PEG for organic solubilization and subsequent polymerization: lipase, catalase, peroxidase, chymotrypsin, subtilisin, superoxide dismutase, asparaginase and cholesterol oxidase. The term protein refers generally to biopolymers comprising amide linked amino acids having molecular weights of approximately 10,000 or greater.

To characterize a model system under the present invention, polyethylene glycol modified subtilisin was solubilized in organic solvents, analyzed for activity and stability in a variety of solvents and solvent mixtures, and subsequently incorporated into polymethyl methacrylate during the polymerization of the monomers.

Data indicate that the modified "monomeric" protein retains full activity, with little effect on the ability of the enzyme to recognize its substrate. Further, the PEG-modified protein is remarkably stable (half-life increases from approximately 18 hours to over three months). Amino-acid analysis and electrospray mass-spectroscopy were utilized to determine the extent of modification. The attachment of two molecules of 8,000 molecular weight PEG-acrylate to subtilisin was sufficient to enable solubilization, and stability, in a wide range of solvents. Immobilized metal affinity chromatography was a useful tool in purification of the modified protein from unattached PEG. The specific PEG utilized was itself modified by the presence at one terminal of an acrylic moiety.

The solubilized, modified protein may be polymerized in organic solvents to incorporate the protein, as a co-monomer, in a variety of vinyl, including acryl, polymers. The vinyl comonomers are preferably selected to be water-insoluble. The present vinyl polymers may, for example, incorporate the following organic-soluble, vinyl comonomers: methyl methacrylate, methyl acrylate, butyl methacrylate, hydroxy ethyl methacrylate, styrene, alpha-methyl styrene, vinyl chloride, vinyl acetate, vinyl pyrollidone or combinations thereof. Preferably, the following organic-soluble, vinyl comonomers are used: methyl methacrylate, methyl acrylate, butyl methacrylate or hydroxy ethyl methacrylate. The modifying moiety (e.g., PEG) is preferably functionalized with a vinyl group such as an acrylate or an acrylamide.

The use of organic solvents as the reaction media enables rational design of desirable polymer properties while maintaining the activity of the protein. Many organic solvents are suitable for the present free-radical addition polymerization including, without limitation, chloroform, tetrahydrofuran, methanol, carbon tetrachloride, methylene chloride, toluene benzene, alkanes, fluoroform, dioxanes, ethanol, dimethyl formamide, diethyl ether and carbon dioxide.

The protein-containing polymer was analyzed for activity and polymer properties, and the results indicate that active subtilisin can be incorporated into polymethyl methacrylate during free-radical initiated polymerization of methyl methacrylate in organic solvents.

A detailed description of the experimental procedures used in synthesizing and characterizing the above model system is set forth below.

EXPERIMENTAL PROCEDURES

Subtilisin Carlsberg was obtained from Sigma Chemical Co. The polyethylene glycol derivative, polyethylene glycol monomethacrylate, was purchased from MTM Research Chemicals, Inc. in several molecular weights or synthesized enzymatically. All other reagents were from either Sigma Chemical Company or Aldrich Chemical Company and were of the highest purity available.

1. PEG-Aldehyde Synthesis

Aldehydes were produced from PEG using a monomethacrylate (number average MW=8,000) method adapted from Wirth et al., *Bioorg. Chem.*, "Chemical Modification of Horseradish Peroxidase with Ethanol Methoxy PEG," 19, 133–142 (1991), the disclosure of which is incorporated herein by reference. The synthesis was conducted in a glove box under a nitrogen atmosphere. A solution of methylene chloride (MC) (5 ml) and dimethyl sulfoxide (DMSO) (3.4 ml) was added drop-wise to a solution of MC (25 ml) and oxalyl chloride (1.3 ml) while in a −70° C. bath. The addition was controlled so the temperature did not exceed −55° C. Ten minutes later, a solution of PEG monomethacrylate (10 mmol) in MC (400 ml) was added drop-wise. The temperature was maintained at −20° C. for one hour, then 5.6 g of 1,4-diazabicyclo[2.2.2]octane were added. The solution was then brought to room temperature and washed with 50 ml of water. The organic layer was collected, dried with $MgSO_4$, and filtered. The remaining liquid was evaporated to solid, dried in a vacuum oven, and stored in an amber jar.

PEG monomethacrylates were thus oxidized to the corresponding aldehydes. The product was a solid after evaporation of the solvent. A precipitate formed with using a 2,4-dinitrophenylhydrazine test, indicating the presence of an aldehyde. Fourier transform infrared spectroscopy (FT-IR) was used to confirm these results. The PEG-aldehyde was not separated from the starting material, since the reactant impurities do not interfere with the subsequent modification of the protein. In addition the separation of 8,000 molecular weight PEG monomethacrylate from 8,000 molecular weight PEG aldehyde monomethacrylate would be extremely difficult. The approximate yield of aldehyde, according to a quantitative assay based on the 2,4-dinitrophenylhydrazine test was 70–80%. The stench associated with the aldehyde synthesis is considerable, and the use of a fume hood throughout the handling of the aldehyde and any contaminated glassware is advisable.

2. Modification of Subtilisin with the PEG-aldehyde

The PEG-aldehyde was reacted with free amino groups of the enzyme in the presence of a reducing agent under mild conditions according to the method of Wirth et al., supra. Once the modified protein has been modified and solubilized in organic solvents, the possibility exists to further modify the protein using procedures which can only be performed in organic solvents. The reductive alkylation reaction which attaches PEG to proteins has little or no effect on the activity of proteins. Wirth et al., supra.

In a typical reaction scheme, subtilisin (9.1 μmol) was dissolved in 8.0 ml of 0.1M borate buffer, pH 9.0. The aldehyde (0.25 mmol) was added, along with sodium cyanoborohydride (0.2 mmol), while shaking the solution. The solution was placed in a 18° C. water bath for 3.5 to 4 hours. The solution was then passed through a Sephadex G-25 gel filtration column, with protein being detected spectrophotometrically as fractions were collected. Fractions containing the modified protein were lyophilized.

Other synthetic schemes for the attachment of a modifying moiety such as PEG to an enzyme are possible. For example, typical reaction schemes for the modification of a protein with PEG including, reductive alkylation, are given in FIG. 1. Each such published method has both advantages and disadvantages. A popular PEG-modification procedure involves the use of cyanuric chloride. Inada, Y., Takahashi, K., Yoshimoto, T., Ajima, A., Matsushima, A., and Saito, Y., *TIBTECH*, "Application of PEG-enzymes in Biotechnological Processes," 190–194, (July 1986); Takahashi, K., Yoshimoto, T., Ajima, A., Tamaura, Y., and Inada, Y., *Enzyme*, "Modified Lipoprotein Lipase Catalyzes Ester Synthesis in Benzene," 32, 235–240 (1984); and Takahashi, K., Kodera, Y., Yoshimoto, T., Ajima, A., Matsushima, A., and Inada, Y., *Biochem. Biophys. Res. Commun.*, "Ester-exchange Catalyzed by Lipase Modified with PEG," 131(2), 532–536 (1985), the disclosures of which are incorporated herein by reference. Although the cyanuric chloride method is rather toxic, the yields are greater than provided by the method of Wirth et al. Succinimidylsuccinates of PEG have also been used, although modification yield, purification problems, and inhibition of activity can all cause problems. Veronese, F., Largajolli, R., Bocc., E., Benassi, C., and Schiavon, O., *Appl. Biochem Biotech.*, "Surface Modification of Proteins, 11, 141–152 (1985); Inada, Y., Yoshimoto, T., Matsushima, A., and Saito, Y., *TIBTECH*, "Engineering Physicochemical and Biological Properties of Proteins by Chemical Modification," 68–73 (March 1986); and Matsuyama, H., Taguchi, R., and Ikezawa, H., *Chem. Pharm. Bull.*, "Phospholipase Modified with a PEG Derivative," 39(3), 743–746 (1991), the disclosures of which are incorporated herein by reference.

3. Characterization of Modified Protein

Modification was verified by passing a modified sample through a Protein Pak 200SW column (Waters) using a Waters HPLC (model 600E, 490E detector). Alternatively, conventional gel filtration was used to separate the characterize the modified protein. Fractions were checked for activity using the substrate assay described below. Electrospray mass spectrometry and amino acid analysis were also performed to verify that the protein had indeed been modified. Amino acid analysis was also used to quantitate the percent of modified protein in the powdered preparation.

The addition of PEG aldehyde to subtilisin, in the presence of either sodium cyanobrorohydride or sodium borohydride resulted in the covalent linkage of PEG monomethacryalte groups to the protein. FIGS. 2a–2d demonstrate that pH, reaction time and the concentration of reactants each play a role in determining the extent of modification. FIG. 2a–2d show these effects for the native subtilisin as well as for singly, doubly, triply and quadruply modified subtilisin.

As discussed above, there are, of course, many techniques by which PEG can be covalently attached to proteins, and the method chosen would not be expected to impact the overall process.

Figure 3A:
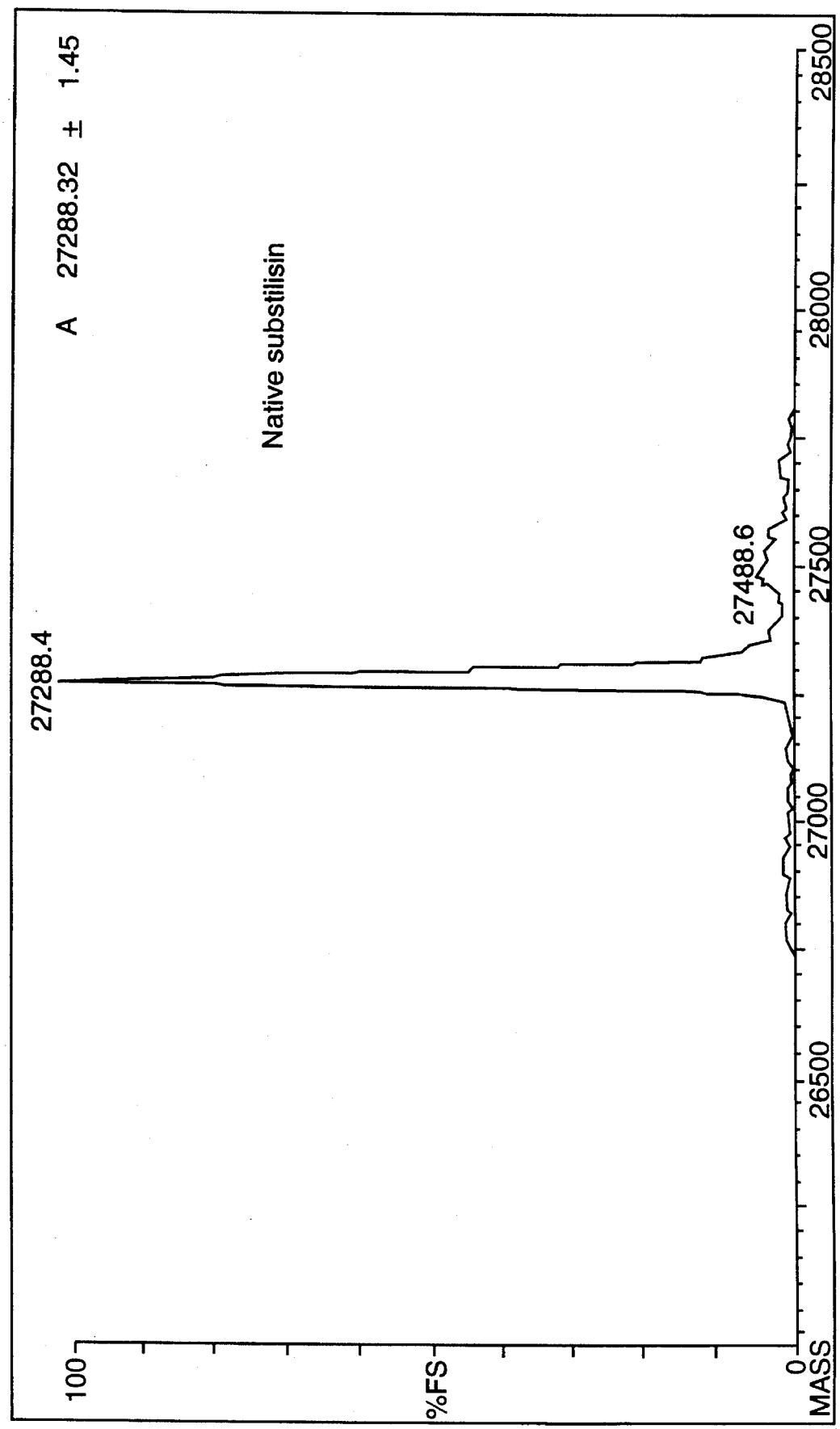
FIG. 3a is an electrospray mass spectroscopy of native subtilisin.
Figure 3B:
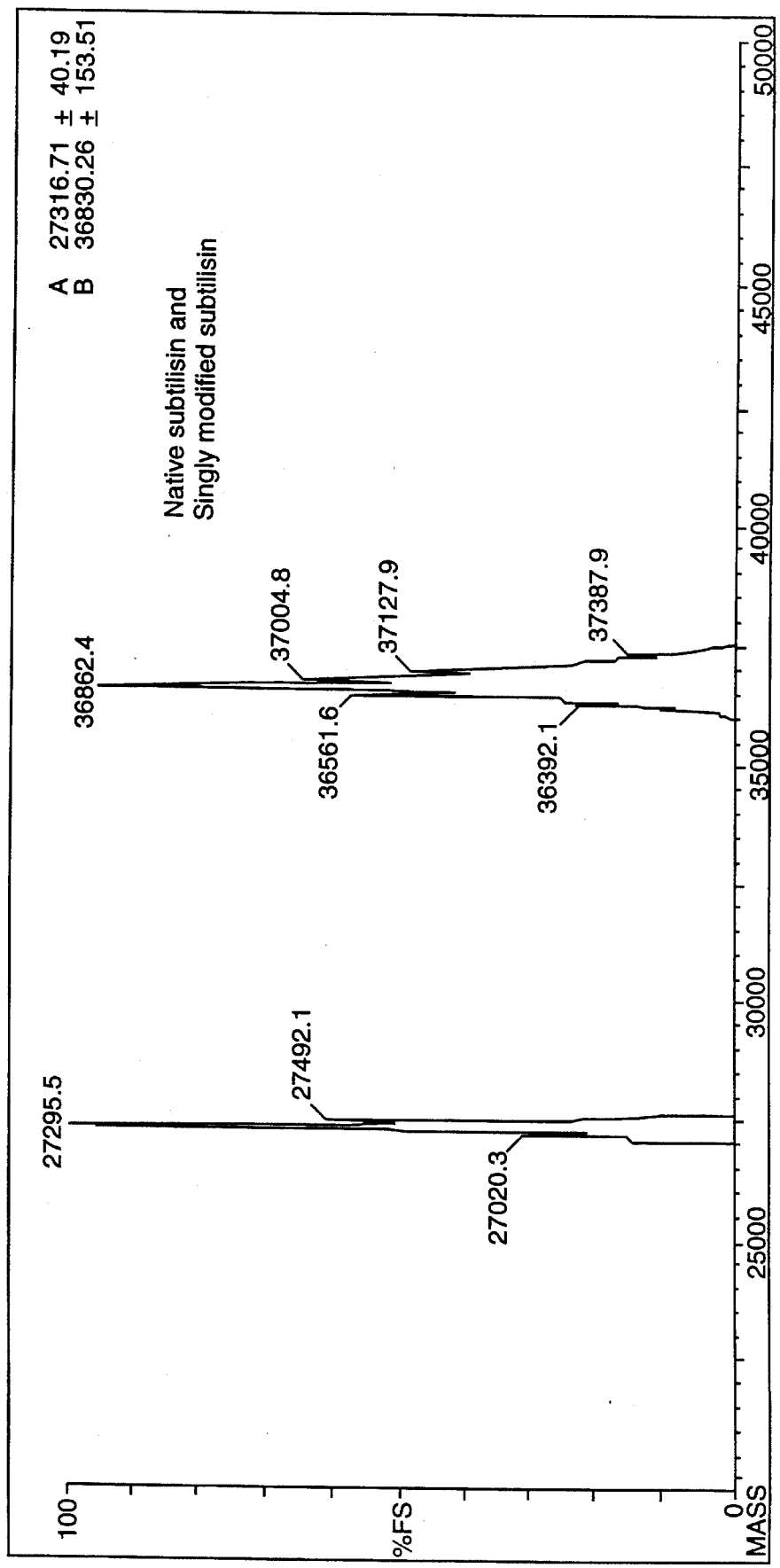
FIG. 3b is an electrospray mass spectroscopy of singly PEG-modified subtilisin and native subtilisin.
Figure 3C:
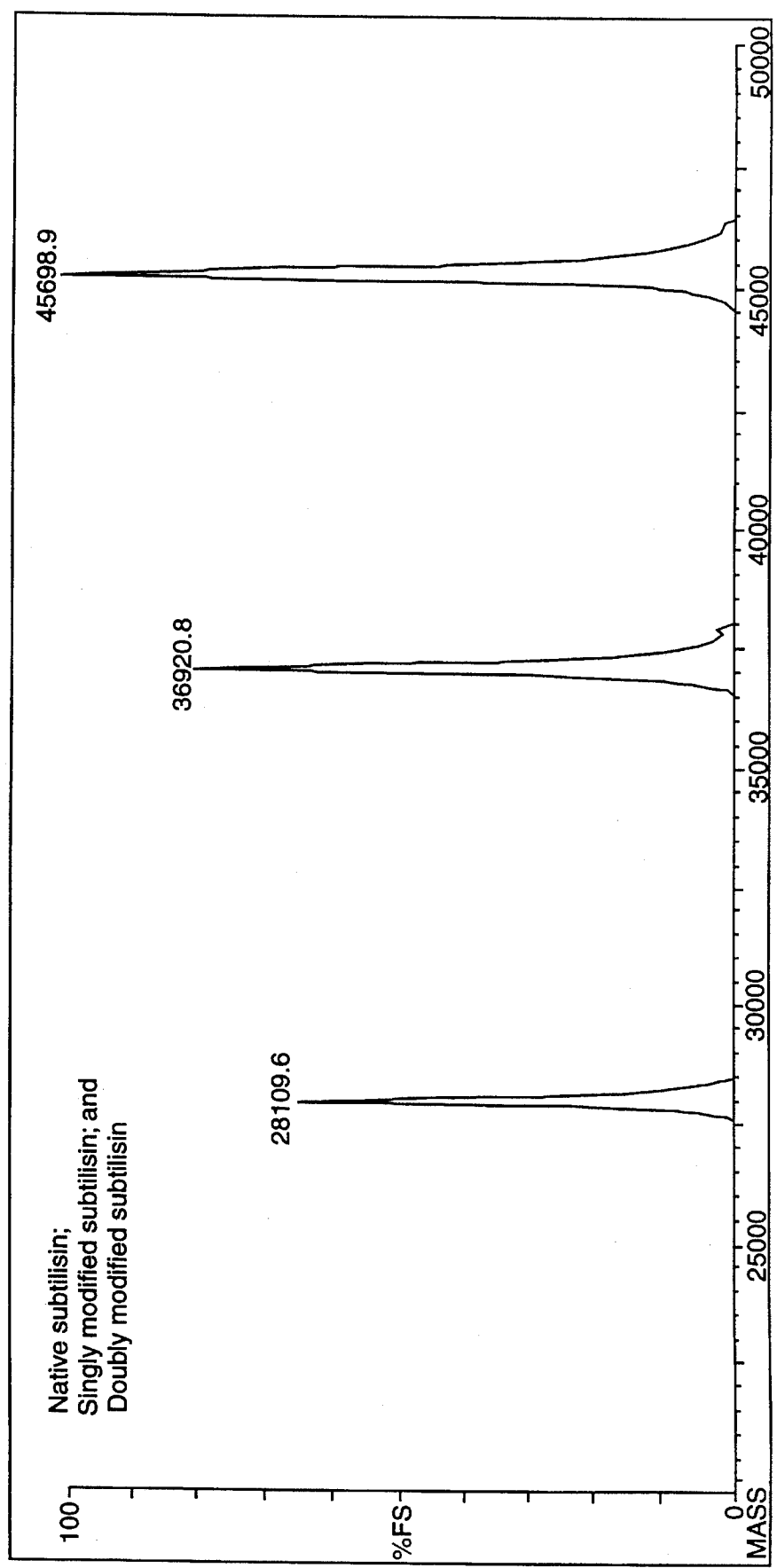
FIG. 3c is an electrospray mass spectroscopy of doubly PEG-modified subtilisin, singly PEG-modified subtilisin and native subtilisin.

Adsorption of the protein fractions at 280 nm after gel filtration chromatography showed three peaks, one with a slight shoulder. HPLC confirmed the presence of four peaks. Electrospray mass spectroscopy on the neat and fractionated samples also indicated that single, double and triple, modification(s) had taken place (for example, see FIGS. 3a–3c). This result was confirmed by amino acid analysis. PEG-modification of proteins has been reported many times previously, and it is not surprising that it is straightforward to synthesize a modified subtilisin. The properties of subtilisin modified with the relatively large PEG monomethacrylate have not been reported previously. Amino acid analysis demonstrated that between 20 to 60% of the unmodified protein became covalently linked to PEG.

4. Solubility of the Modified Protein

The modified subtilisin is soluble in several organic solvents, up to 5 $mg_{powder}$/ml, including: tetrahydrofuran, dioxane, 1,1,1-trichloroethane, chloroform, methylene chloride, toluene, dimethyl sulfoxide, carbon tetrachloride and acetonitrile. In solubility studies, approximately 20 mg of the lyophilized, modified protein powder was added to 4 ml of several organic solvents. The solubility of each solution was tested by visual inspection and by activity in the presence of a substrate. Solubility was independent of the removal of unreacted PEG from the system. For modified subtilisin to remain in solution in tetrahydrofuran and acetonitrile slight heating was required.

The powder is not soluble in solvents such as hexane, acetone, ethyl ether and isoamyl alcohol. The solubility data provides further confirmation of modification, since native subtilisin is not soluble in any of the above solvents. The data also indicate that the presence of the methacrylate group on the PEG does not alter the well known ability of PEG-modified proteins to be solubilized in organic media.

It is noted that the solubilization of PEG modified proteins in organic solvents has been questioned by Halling and colleagues. Halling has suggested that PEG-proteins are not soluble in organic solvents, but instead form aggregates which can give rise to an optically transparent solution. This distinction is not important, however, when considering the use of a PEG-modified protein for polymer synthesis in organic media. The use of the term "solubilization" in connection with the present modified enzymes in organic solvents is thus intended to cover actual solubilization as well as the formation of such aggregates or other physiochemical phenomena through which proteins exist in the organic phase.

5. Purification of the Modified Protein from Unreacted PEG

The solubility of PEG-subtilisin in organic solvents can be used to purify the modified protein from unmodified protein. It is important that this purification is achieved since future use of the modified protein will depend on low contaminating levels of native subtilisin. It is also important to remove contaminating PEG, which is not covalently linked to the protein. The difficulty of performing this separation is illustrated by the fact that most researchers describing the use of PEG-proteins do not attempt to remove the unreacted PEG.

It was determined that gel filtration or ion exchange chromatography were not sufficient to remove the 8,000 molecular weight linear PEG from the modified protein. However, immobilized metal affinity chromatography (IMAC) was a useful method for the separation of PEG and PEG-protein. IMAC was, therefore, utilized to separate modified and unmodified subtilisin.

Specifically, this fractionation technique exploits the ability of certain surface exposed amino acids (His, Cys, or Trp) to bind chelated metals such as divalent copper, nickel, cobalt, and zinc[1,5]. With specific regard to subtilisin, previous work with genetically engineered mutants of subtilisin 51 indicated that substitutions within 15 A of the active site histidine, and alternately, the addition of a histidine residue changed the IMAC retention of this protein. Yip T. T., Nakagawa, Y., Porath, "Evaluation of the Interaction of Peptides with Cu(II), Ni(II), and Zn(II) by High-Performance Immobilized Metal Ion Affinity Chromatography", *J. Anal. Biochem.*, Vol 183, pp. 159–171 (1989), the disclosure of which is incorporated here in by reference. Based on the work of Chicz and Reginer, it was hypothesized that IMAC could be used to fractionate PEG modified subtilisin from unmodified subtilisin. Chicz, R. M., Regnier, F. E., "Immobilized-Metal Affinity and Hydroxyapatite Chromatography of Genetically Engineered Subtilisin", *Anal. Chem.*, Vol 61, pp. 1742–1749 (1989), the disclosure of which is incorporated herein by reference.

The modified and unmodified subtilisin were fractionated by IMAC, utilizing copper as the affinity ligand. Chromatography experiments and the subsequent fractions were held at 4° C. Chromatography experiments were carried out at a flow rate of 0.5 ml/min. IMAC columns were prepared by first rinsing 10 ml (4×1.5 cm) of Chelating Sepharose 6B (Pharmacia) with deionized water and degassing by suction. A slurry of IMAC media was poured into a column, and water was passed in order to settle the chromatography bed. A solution of copper sulfate (30 to 70 mg/ml) was passed through the column to saturate the chelating groups with metal. Unbound Cu(II) was rinsed from the column by passing 5 volumes of water plus 5 volumes of column equilibrating buffer (0.05M Phosphate+0.5M NaCl).

After sample application, the column was developed by (i) rinsing with column equilibrating buffer followed by (ii) a pulse of imidazole (20 mM). Absorbance measurements at 280 nm were determined on-line with a Pharmacia UV-M monitor, and at 240 nm on individual fractions using a Perkin-Elmer spectrophotometer (Perkin-Elmer, Pittsburgh Pa.) After a chromatography run was completed, the column was stripped of metal ions by passing 50 mM ethylenediamine tetraacetic acid/1M sodium chloride.

Another useful method for effecting separation of the modified and unmodified subtilisin is dialysis.

6. Activity Of Modified Subtilisin in Buffer

Kinetic studies of the modified protein were performed using substrate (N-succinyl-L-alanyl-L-alanyl-L-prolyl-L-phenylalanyl p-nitroanilide) in 0.1M Tris-HCl buffer, pH 8.6. The purified HPLC fractions (three total) were tested for activity while increasing the substrate concentrations in equal increments. Substrate concentration versus rate was plotted to determine $V_{max}$ and $K_m$ using non-linear regression analysis. A standard of pure subtilisin was analyzed as a control.

7. Activity of Modified Subtilisin in Organic Solvents

Before reacting PEG-subtilisin with other materials it is necessary to fully characterize the activity and stability of the "bio-monomer". Using solubility, IMAC, and HPLC the modified protein was separated into predominantly singly or doubly modified protein fractions. The subtilisin fractions were, of course, contaminated to some degree with each other, and the data does not indicate that all the enzyme molecules have been modified in the same position. Thus, the activities and stabilities noted are average properties for the sample being studied. For comparison to the native protein, unmodified protein was purified from the modification reaction mixture and characterized to some degree.

As set forth above, the activity of the modified enzymes was assessed with the artificial peptide substrate succinyl-L-alanyl-L-alanyl-L-prolyl-L-phenylalanyl p-nitroanilide. A sample of 30 mg modified protein powder was dissolved in tetrahydrofuran, and filtered with a solvent resistant 0.22 μm filter in order to remove the insoluble native protein. The solvent was evaporated and, as mentioned above, values for Vmax and Km were determined. The kinetic constants, $V_{max}$ and $K_m$, for the unmodified, and singly or doubly modified fractions are listed in Table 1.

TABLE 1

| ENZYME | Tris-HCl buffer | | | 25% dioxane/75% buffer | | |
|---|---|---|---|---|---|---|
| | Km (mM) | Vmax ($\Delta A_{412}$/sec/mg protein) | vmas/Km | Km (mM) | Vmax ($\Delta A_{412}$/sec/mg protein) | vmas/Km |
| native | 0.12 | 108 | 900 | 3.6 | 66.2 | 18.4 |
| unmodified | 0.17 | 2.2 | 12.9 | 5.8 | 2.9 | 0.5 |
| singly modified | 0.17 | 2.9 | 17.0 | 6.0 | 5.3 | 0.9 |
| doubly modified | 0.16 | 1.6 | 10.0 | 14.2 | 1.8 | 0.1 |

As expected, the activity of subtilisin is not substantially different from that of the PEG-subtilisin. Previous work has demonstrated that PEG modification does not interfere with overall activity and specificity. The degree of modification utilized was low to ensure that the modified protein would retain its native activity once incorporated into a polymer.

Subtilisin powder suspended in organic solvents catalyzes the alcoholysis of esters, rather than the hydrolysis reaction catalyzed by the same enzyme in water. The PEG-modified subtilisin was solubilized in THF and the kinetic constants for the methanolysis on N-acetyl-L-phenylalanyl ethyl ester were determined as described previously. At 32° C., 1 mg/ml protein, and 100 mM alcohol, the values for $V_{max}$ and $K_m$ in THF were found to be 0.071 mM/sec and 81 mM respectively, thus the specificity constant for PEG-subtilisin in THF is $5.3 \times 10^{-2}$ min$^{-1}$. Since subtilisin is not soluble in THF, these values must be compared to those of insoluble subtilisin. Vmax and Km in THF for native subtilisin under the same conditions are $1.78 \times 10^{-3}$ mM/sec and 275 mM respectively. Thus, the activity of the modified, solubilized protein is 136 times better than the native protein. This effect is not the result of diffusional limitations in the powdered enzyme preparation since this reaction has been shown not to be diffusionally limited. Without question, PEG-subtilisin is active in organic solvents, and should thus remain active when solubilized in organic solvents, and covalently incorporated into a growing polymer.

8. Stability of Subtilisin

The stability of PEG-subtilisin is also of importance, since the stability of the polymerized protein will probably more closely resemble the modified protein rather than the native protein. The half life of subtilisin and PEG-subtilisin (singly and doubly modified) was determined in buffer, organic solvents, and mixtures of the two. Subtilisin (1 mg/ml) was incubated at 30° C. in either buffer (pH 8.6 Tris-HCl buffer, 0.1M), organic solvent (dioxane), or a mixture of the two. At regular time intervals aliquots were removed and assessed for enzyme activity as described above.

Figure 4A:
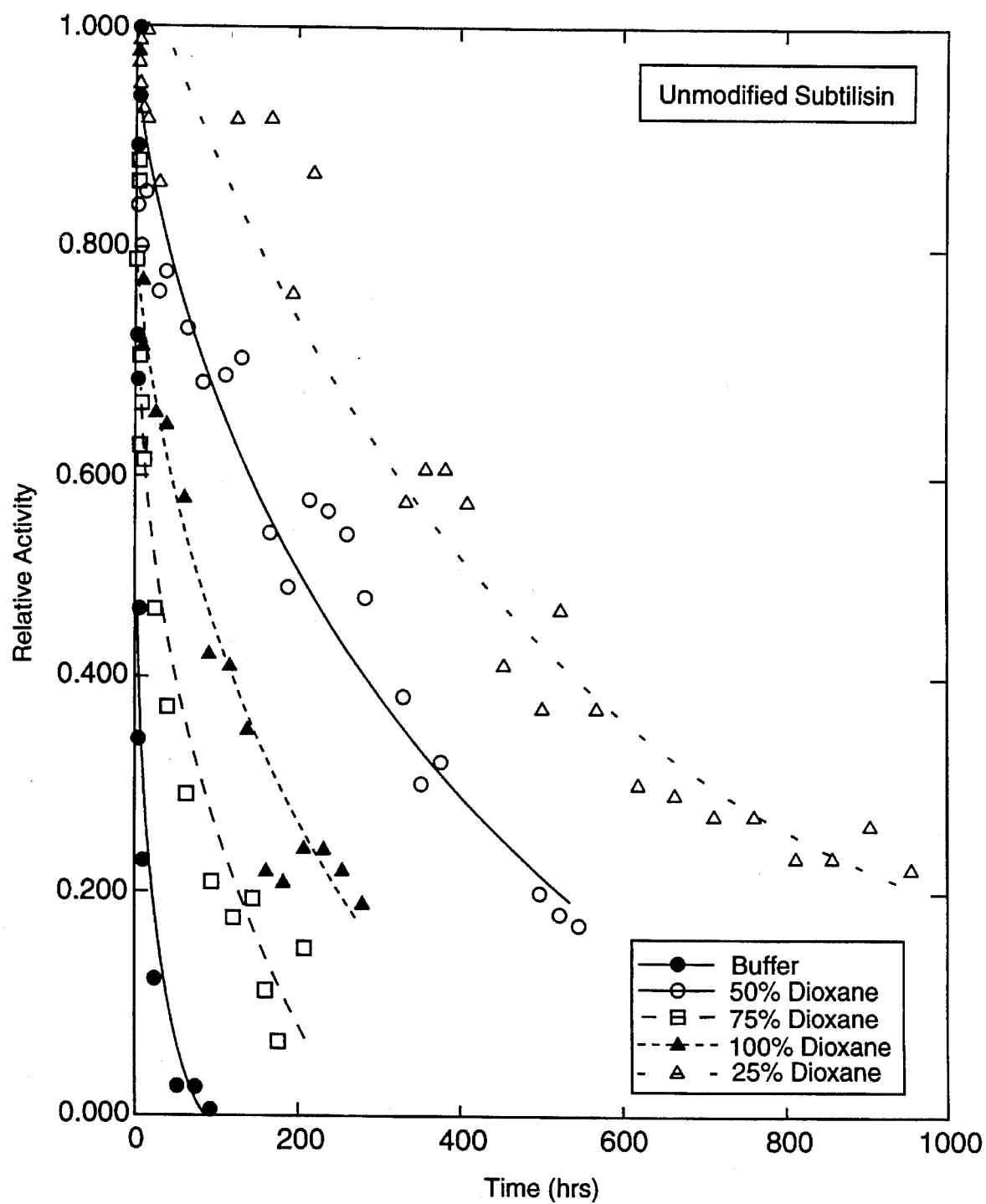
FIGS. 4a–c illustrate the stability of subtilisin and PEG-modified subtilisin in buffer and in dioxane.
Figure 4B:
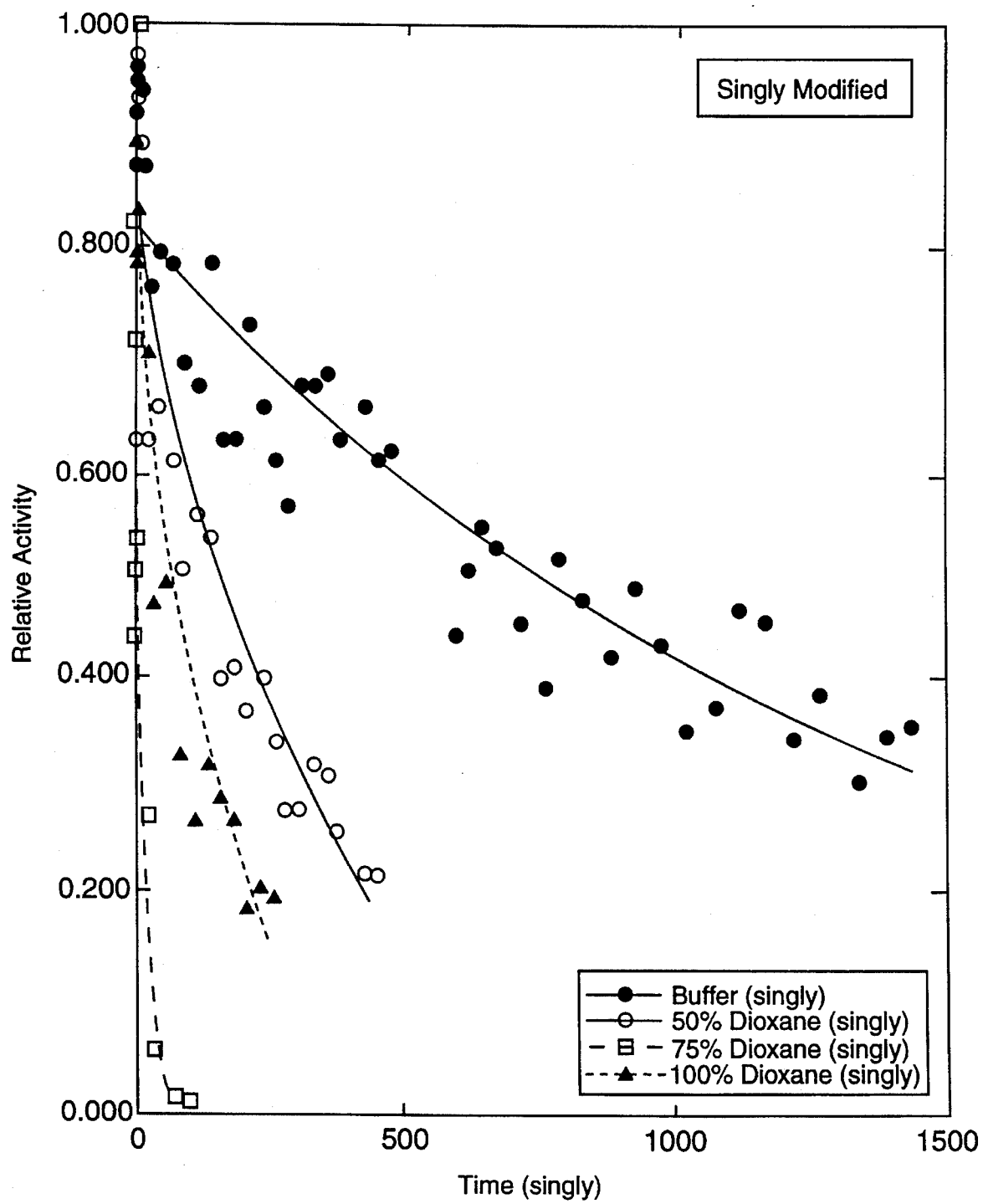
Figure 4C:
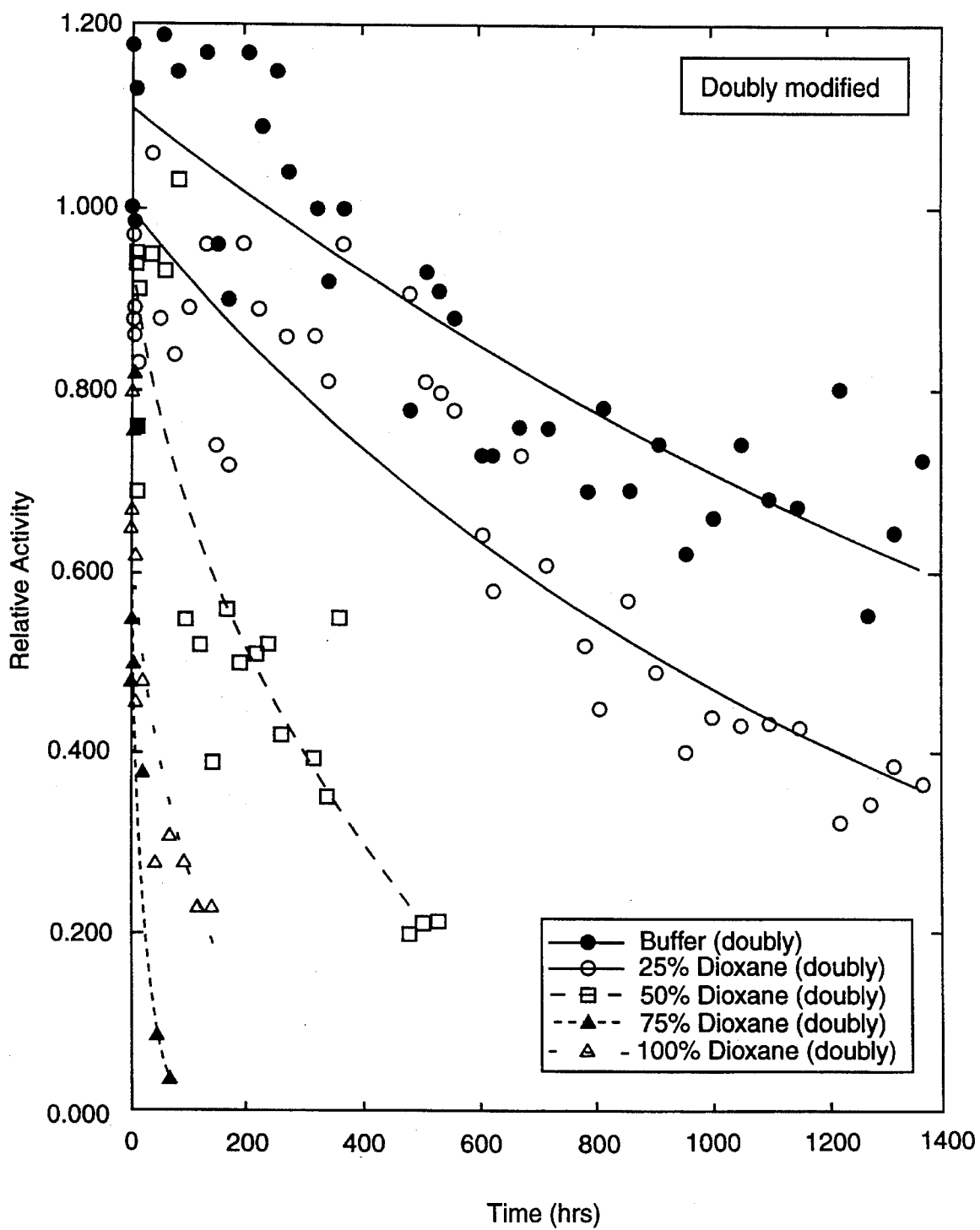

Typical comparisons of enzyme activity decay curves in buffer and dioxane are given in FIGS. 4a–c. Clearly, PEG-subtilisin is remarkably stable in buffer. The half-life increases from 3 hours to 900 hours as a result of a single modification, and to over 3,000 hours as a result of double modification. This striking effect is probably the result of decreased autolysis of subtilisin given the steric hindrance that the large PEG chain must create. Since the stability of the modified protein monomer is significant, and immobilization usually stabilizes proteins, it is reasonable to expect that the protein-containing polymers synthesized will be particularly stable in terms of protein activity. For unmodified subtilisin, the introduction of dioxane into the buffer results in an apparent stabilization of the protein. Once again, the effect of dioxane is likely related to its effect on amidase activity, thus decreasing autolysis. Further evidence for the similar effects of dioxane and PEG-modification are also provided in FIGS. 4a–c, which show that in the presence of dioxane, the modified, and unmodified subtilisin have similar stabilities.

9. Polymerization of the Protein with Methyl Methacrylate

The above results show that subtilisin modified with PEG-monomethacrylate is stable and active in organic solvents. Given that the acrylate moiety can be readily polymerized, singly, and doubly modified subtilisin samples were incorporated into acrylic polymers via synthesis in organic media.

To demonstrate the formation of PEG-acrylic polymers, five different acrylic polymers, varying in their PEG percentages, were synthesized using the conditions described in Table 2. The SEM tests show that there is no significant difference in their particle size and shape. The surface area, determined by BET analysis, varied from 27 m²/g for 1.4% PEG to 39 m²/g for 7.6% PEG, to some degree dependent on the amount of PEG in the preparation. Electron micrographs of these porous polymers showed no difference in the morphology of the polymer (i.e., as compared to a similar polymer absent PEG) when PEG was incorporated at low-percentage. It is thus reasonable to expect that the incorporation of low-percentage PEG-modified protein will not affect the properties of the polymers formed.

TABLE 2

Conditions for Synthesis of PEG-acrylic Polymers

|  | 1 | 2 | 3 | 4 | 5 |
|---|---|---|---|---|---|
| MMA (ml) | 1 | 1 | 1 | 1 | 1 |
| TMA (ml)ᵃ | 0.8 | 0.8 | 0.8 | 0.8 | 0.8 |
| AIBN (ml)ᵇ | 0.15 | 0.15 | 0.15 | 0.15 | 0.15 |
| CHCl₃ (ml) | 3 | 3 | 3 | 3 | 3 |
| CCL₄ (ml) | 22 | 22 | 22 | 22 | 22 |
| PEG (mg) | 13.2 | 27.7 | 42.1 | 56.7 | 71.6 |
| PEG/MMA (% w/w) | 1.4 | 3.0 | 4.5 | 6.0 | 7.6 |

ᵃ50% (v/v) in CHCl₃.
ᵇ1% (w/v) in CHCl₃.

Figure 5A:
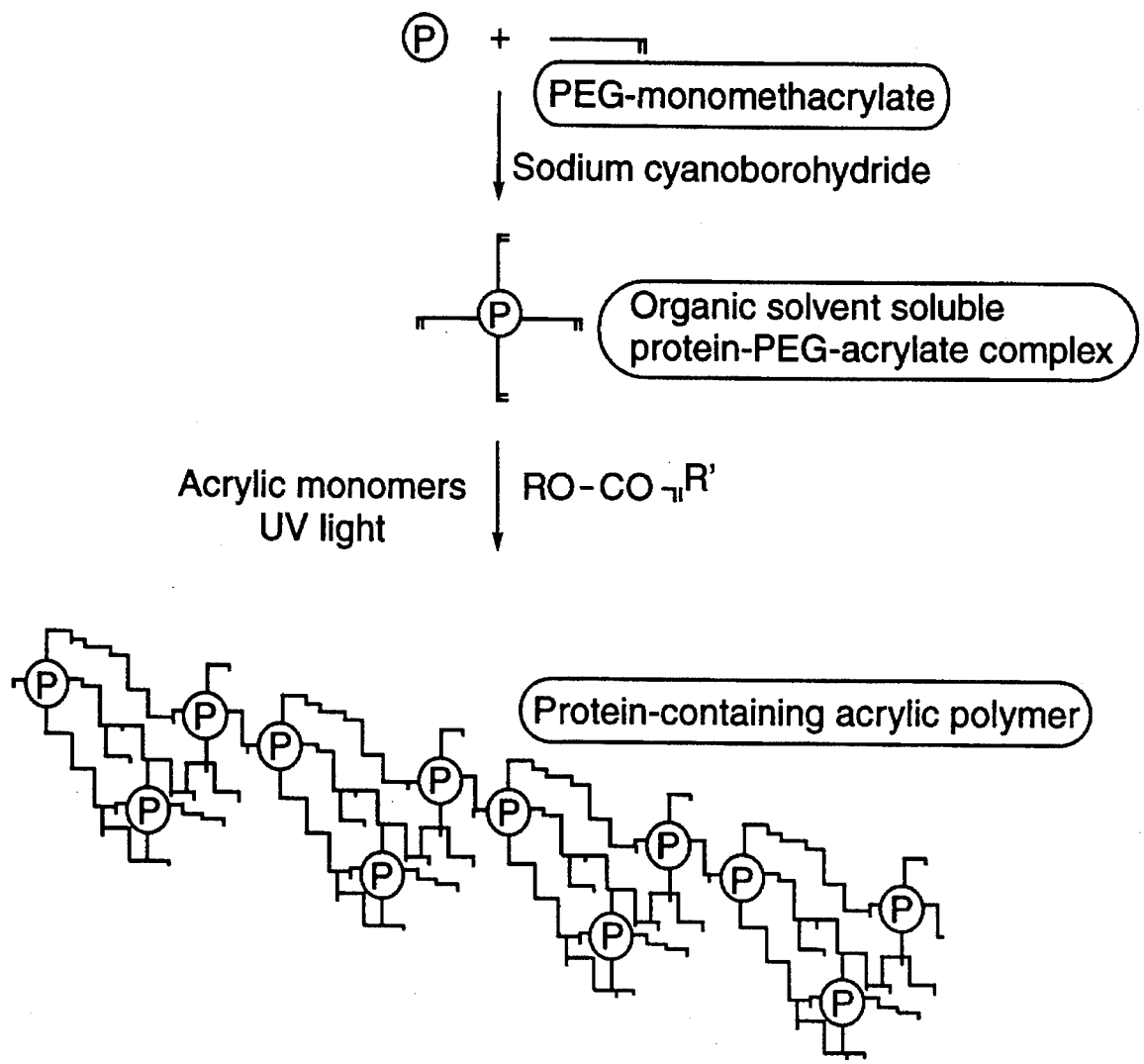
FIG. 5a is a schematic representation of a general method for incorporation of modified proteins into polymers during polymerization in organic solvents.

After the above study, a subtilisin-containing PEG-acrylic polymer was synthesized via free-radical addition polymerization. A schmatic representative of a general method for incorporation of modified enzyme into polymers via free-radical addition polymerization in organic solvents is provided in FIG. 5a.

Figure 5B:
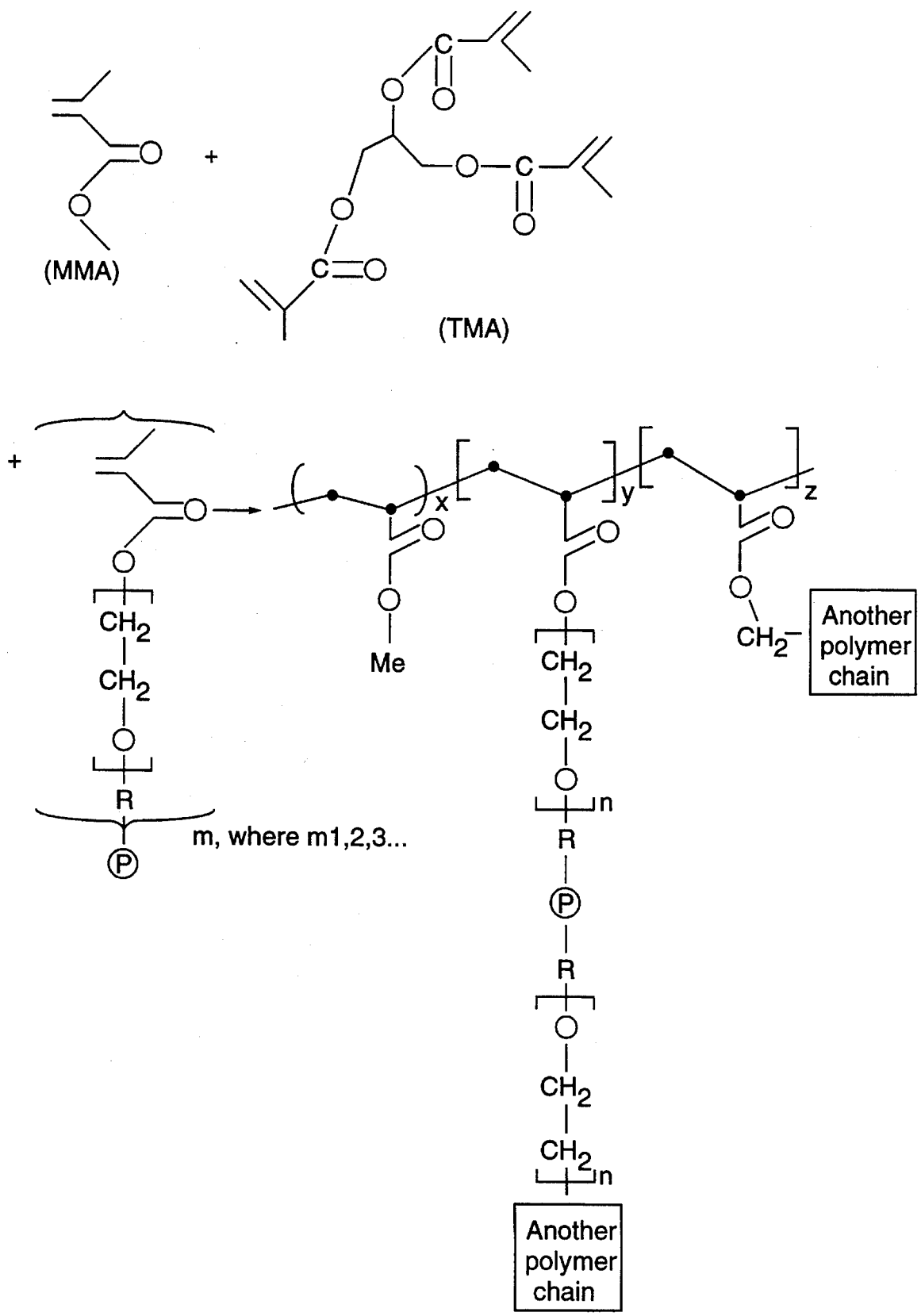
FIG. 5b is an example of a free-radical addition polymerization in which an enzyme modified with a PEG monomethacrylate is reacted with methyl methacrylate and trymethylol propane trimethacrylate.

In a typical polymerization, 102 mg of the modified protein, 1 ml of methyl methacrylate (MMA), 0.04 ml of trimethylol propane trimethacrylate solution (TMA) (50/50 TMA/chloroform as crosslinker), and 0.1 ml of AIBN solution (1 g AIBN in 100 ml chloroform) were placed in 25 ml of carbon tetrachloride. This reaction is illustrated in FIG. 5b. The polymerization was initiated by UV light at 365 nm. After polymerizing for hours, the solvent was evaporated from the polymer. Table 3 indicates the conditions used for the synthesis of two different types of acrylic polymers (disks and porous beads).

TABLE 3

Typical Polymerizations

| Material | Disk Wt/Wt % | Porous Bead Wt/Wt % |
|---|---|---|
| MMA | 4.0 | 2.3 |
| TMA | 0.2 | 1.0 |
| AIBN | 0.004 | 0.004 |
| Chloroform | 95.4 | 19.5 |
| Carbon Tetrachloride | 0.00 | 77.0 |
| Modified Enzyme | 0.4 | 0.2 |

The synthesis of these different classes of enzyme-containing acrylic polymers demonstrates that organic phase polymerization can be fine tuned to select the properties of the resulting protein-containing polymer. Using the conditions described in Table 3, both nonporous and porous samples of protein-containing cross-linked acrylic polymers were synthesized. In each case set forth in Table 3, no affect on polymerization was observed when either 1, 2, 3, 4, or 5% PEG or PEG/protein was added to the reaction mixture.

A comparison of electron micrographs of porous polymers with and without protein showed no difference in the morphology of the polymer when protein was incorporated at relatively low weight percent. Scanning electron microscopy (SEM) was also performed on polymer samples synthesized with 1, 2, 3, 4, or 5% PEG or PEG/protein. BET analysis of the PEG-acrylate containing porous polymethylmethacrylate indicated a surface area of 35.8 m²/g. The value was to some degree dependent on the amount of modified PEG in the preparation, with surface areas as low as 25.4 m²/g being obtained with 5% modified PEG.

Figure 5C:
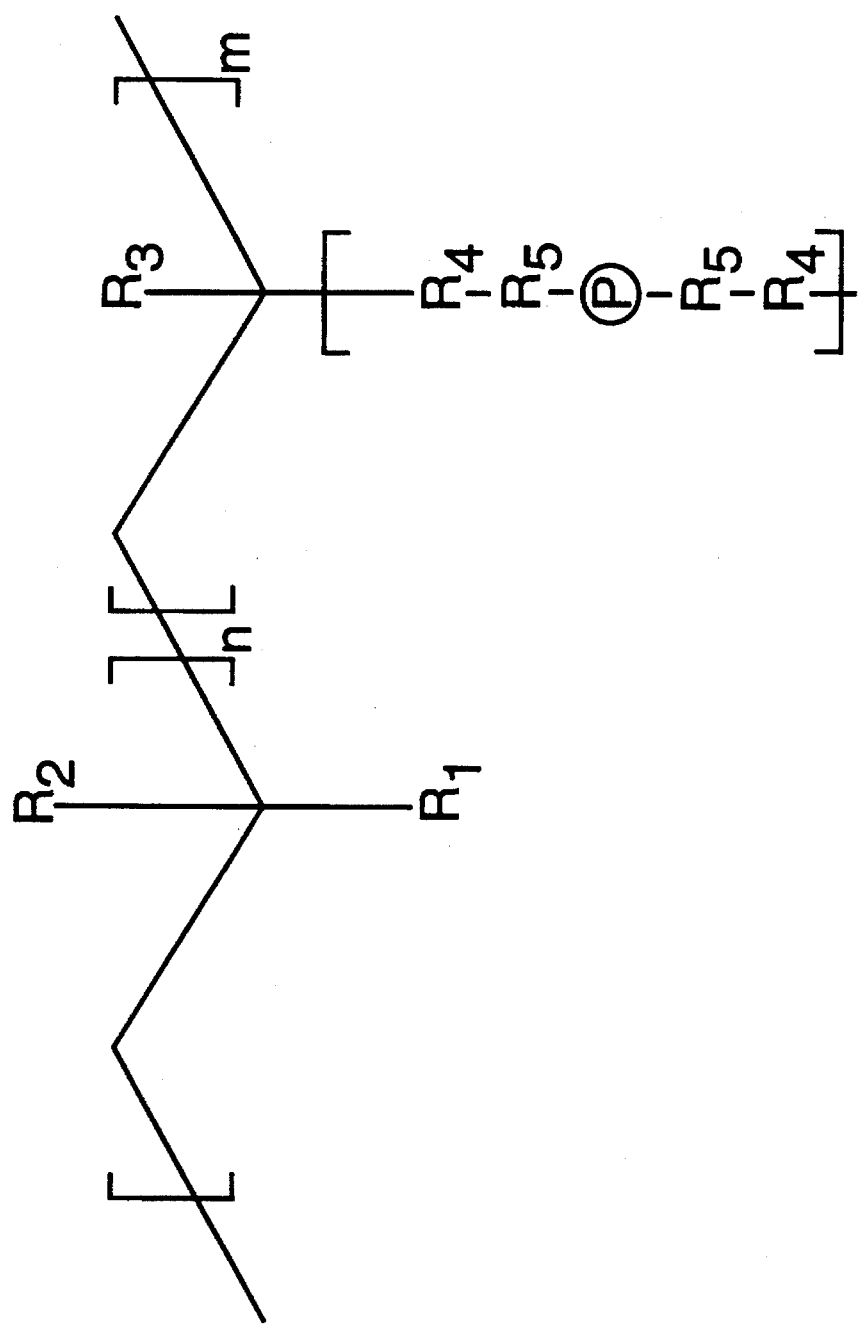
FIGS. 5c and 5d are schematic representations of general formulas of a vinyl polymer incorporating a protein.

FIG. 5c provides a general formula of a protein-containing vinyl polymer. In this formula the protein is represented by the encircled letter "P." $R_4$ represents the functionalize modifying moiety, while $R_5$ is a linking group used to attach the modifying moiety to the protein. When the modifying moiety is a polyalkylene oxide, for example, the linker group can be selected from those set forth in FIG. 1. Generally, such linking groups react with an amino group of the protein. $R_1$, $R_2$ and $R_3$ can be selected from any alphatic or aromatic group. By keeping the protein content of the polymer low, the physical properties of the polymer can be determined by the selection of $R_1$ and $R_2$ as generally known in the art (i.e., the protein-containing polymer will have the physical properties of a similar polymer absent the protein). Therefore, in FIG. 5c, preferably m<<n.

Figure 5D:
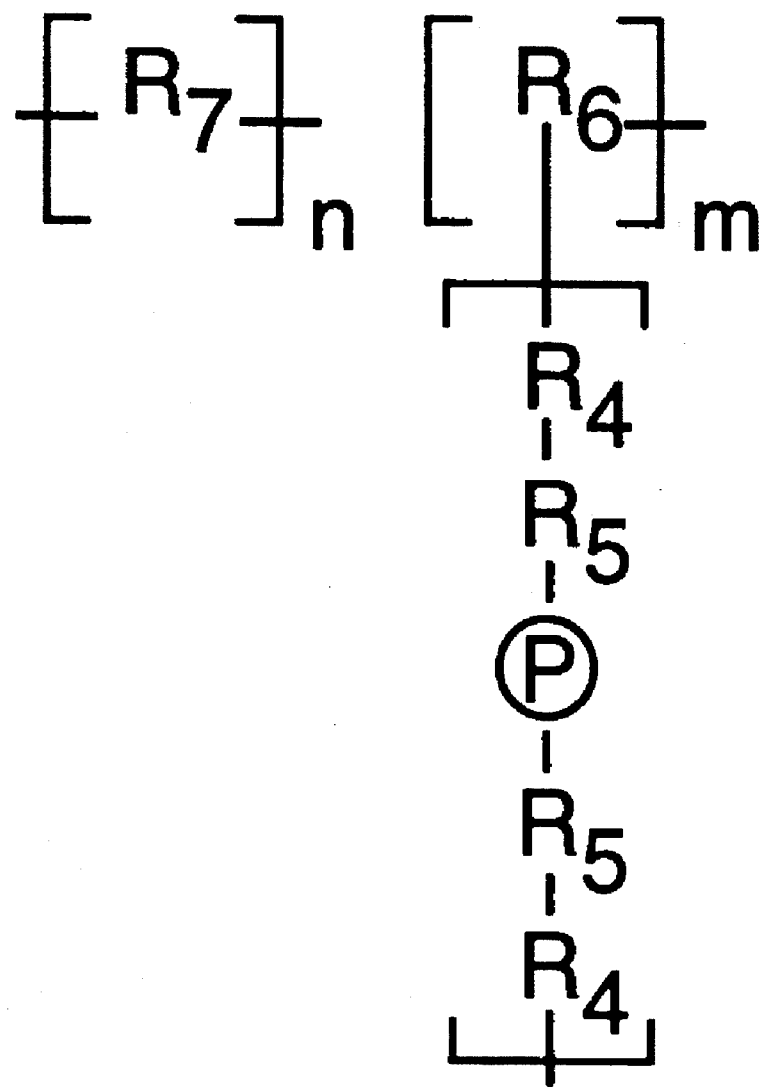

Alternatively, the formula of a protein-containing vinyl polymer can be written even more generally as shown in FIG. 5d. In this figure, $R_6$ represents any vinyl comonomer or combination of vinyl comonomers and $R_7$ represents the vinyl functional group attached to modifying moiety $R_4$ to effect the free-radial addition polymerization. Once again, $R_5$ represents a linker group as shown, for example, in FIG. 1.

10. Enzymatic Activity of the Polymer

Figure 6:
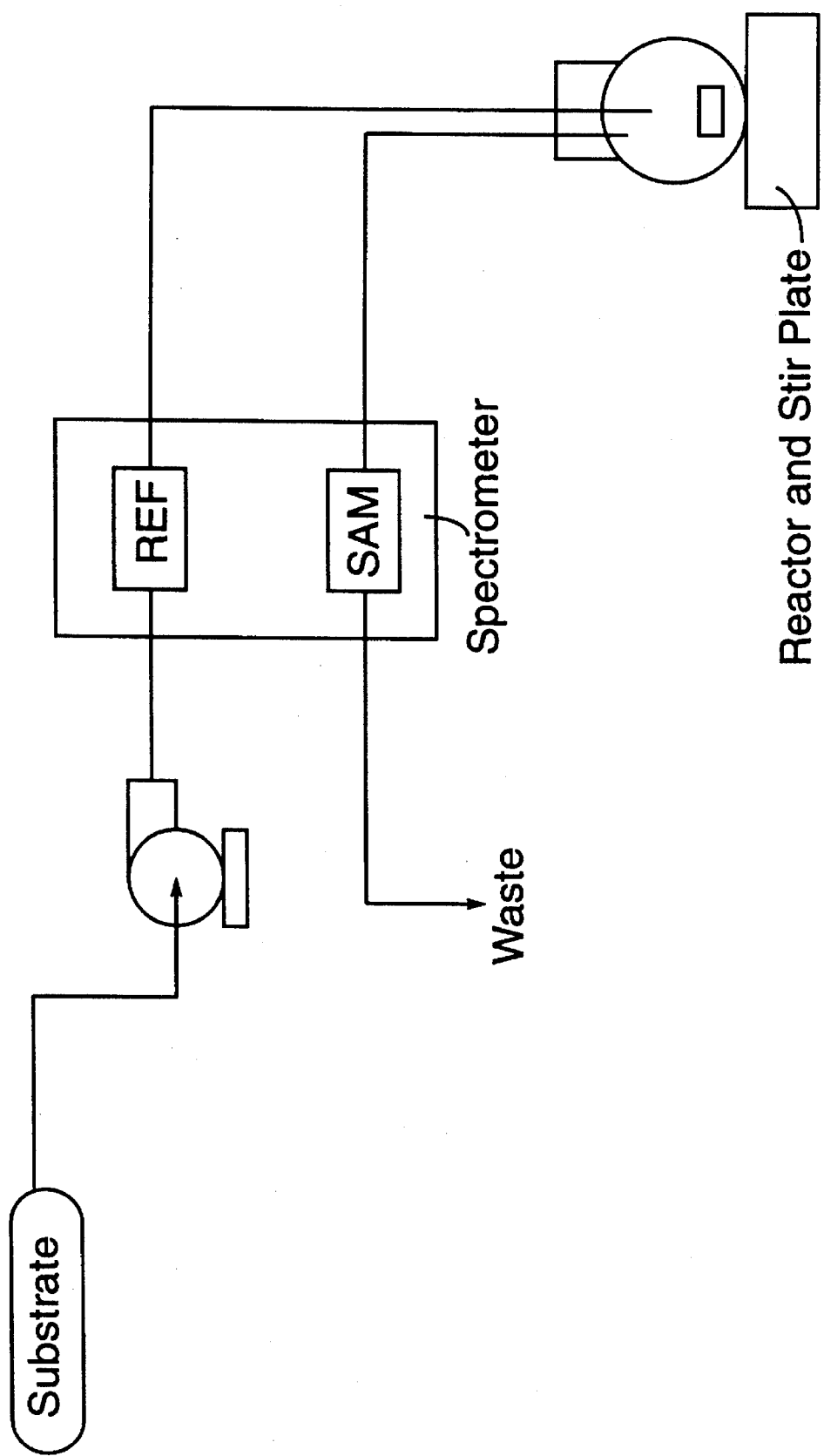
FIG. 6 is a schematic illustration of an apparatus for testing enzyme-polymer stability and activity.
Figure 7:
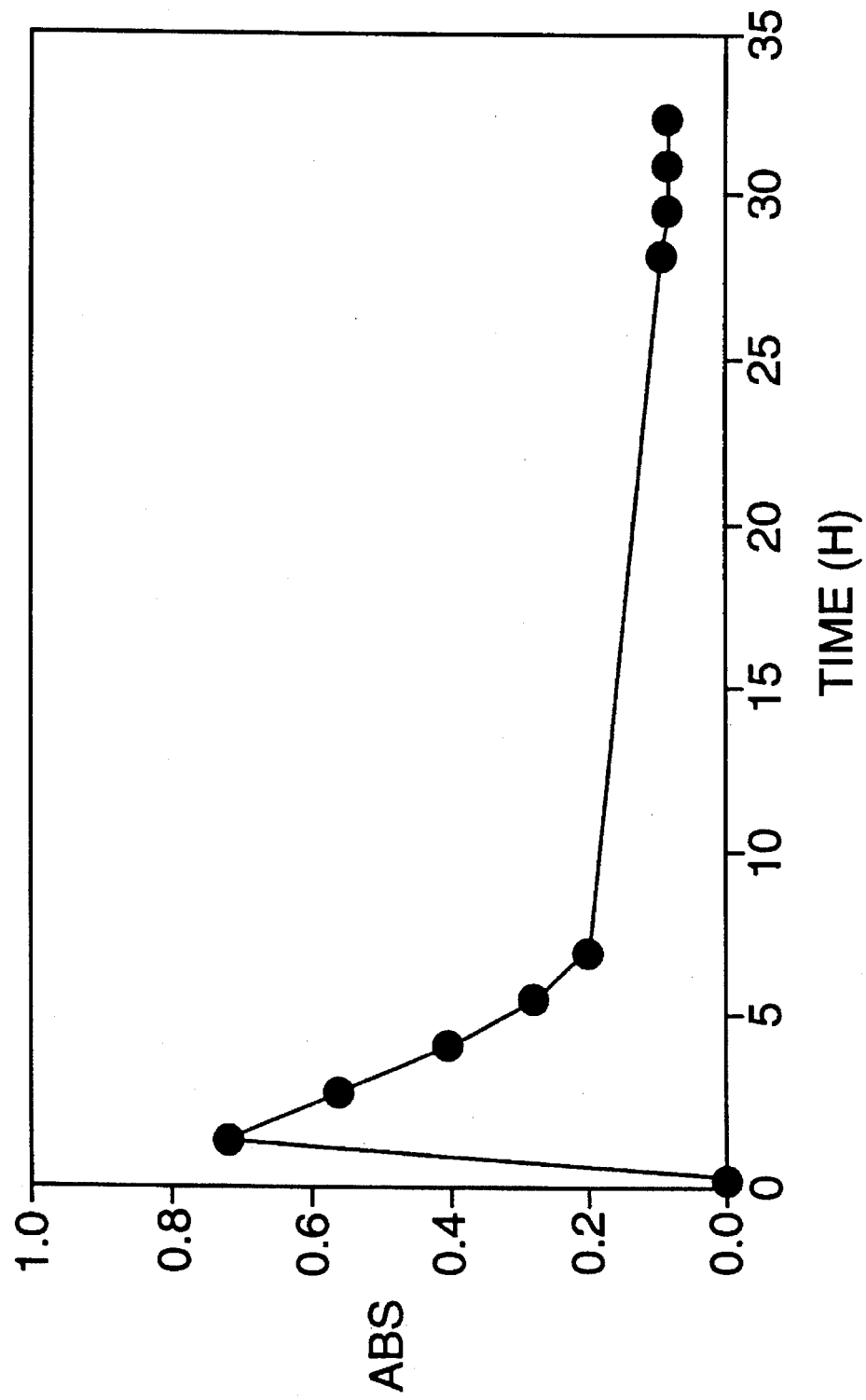
FIG. 7 illustrates the results of activity studies for an enzyme-containing polymer in a continuous stirred tank reaction (CSTR).

The polymer was placed in 50 ml of water overnight to remove any free enzyme that was present. After washing with an additional liter of water, the activity of the polymer was determined as mentioned previously. The procedure was repeated twice. The polymer remained enzymatically active after washing overnight and absorbance at 280 nm was observed, indicating that the enzyme was strongly covalently attached to the polymer and also that the enzyme in this situation was very stable. The activity of the enzyme-containing polymer was demonstrated not only by batch experiments but also by using a simple flow cell apparatus incorporating a continuous stirred tank reactor (CSTR) (see FIG. 6). The results of the CSTR activity studies are provided in FIG. 7. Activity was determined spectrophotometrically, as described above. As seen in FIG. 7, the "biopolymer" maintained substantial activity over six (6) hours. Moreover, the same spectrum was obtained wen the reaction was restarted the next day, indicating that the enzyme was very active and stable.

CONDENSATION POLYMERIZATION

Appropriate functionalization of the modifying moiety or moieties used to solubilize a protein in organic solvents also enables the incorporation of such proteins into a polymer matrix via condensation polymerization under the present invention. Instead of incorporating a vinyl functional group into the modifying moiety as set forth for the free-radical addition polymerization described above, condensation polymerizations can be carried out by incorporating functional groups such as amino groups, hydroxyl groups and carboxyl groups into the modifying moiety (preferably at one terminal thereof). Subsequent polymerization with appropriate copolymers enables the synthesis of condensation polymers including polyurethanes, polyesters polyamides and polyureas.

Representative condensation polymerizations for synthesizing a polyurethane, a polyester, a polyamide and a polyurea are provided in FIGS. 8a, 9a, 10a and 11a, respectively. FIGS. 8b, 9b, 10b and 11b provide general formulas for a protein-containing polyurethane, polyester, polyamide and polyurea, respectively. The enzyme or protein is designated by the encircled "P" in these Figures. Generally, the reaction conditions for condensation polymerization under the present invention may be those well known in the art. Such condensation polymerizations are discussed generally in G. Odian, *Principles of Polymerization,* 3rd ed., John Wiley & Sons, Inc. (1991), the disclosure of which is incorporated herein by reference. High temperature polycondensations should be avoided as the activity of the protein may be destroyed. Preferably, the reaction temperature is kept below 100° C. More preferably, the reaction temperature is kept below 80° C.

For both condensation polymerizations and free-radical addition polymerization, singly modified enzymes (e.g., n=1 in FIG. 8a) will result in a polymer matrix incorporating pendant enzyme groups. Through double, triple and further modification of the enzyme, main chain, branched or cross-linked, enzyme-containing copolymers can be obtained.

1. Polyurethanes

Figure 8A:
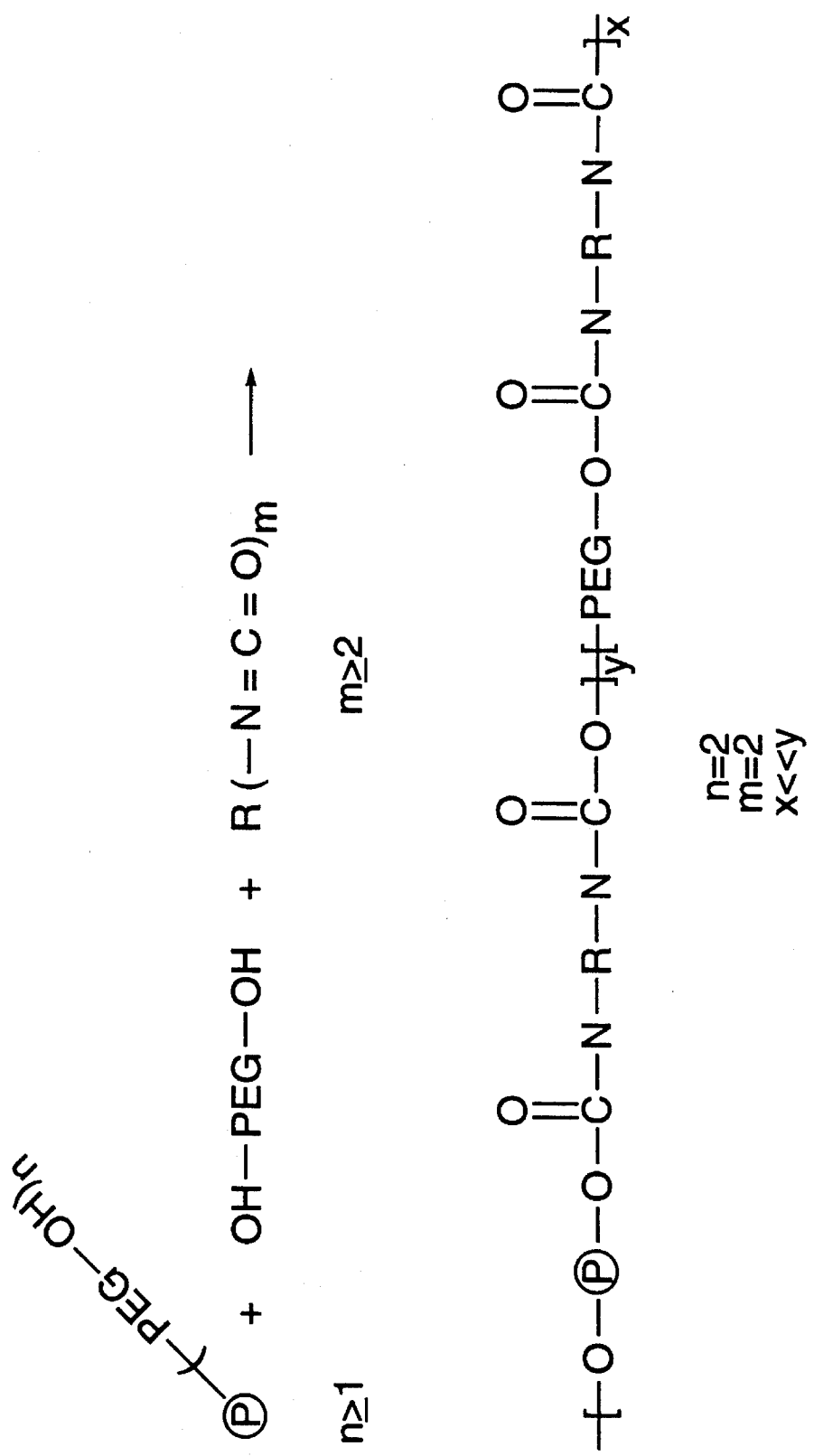
FIG. 8a is a representative illustration of a typical condensation polymerization of a protein-containing polyurethane.

As shown in FIG. 8a, polyurethanes under the present invention may preferably be synthesized by reacting a modified protein with a diol, preferably a polyol such as a hydroxyl-terminated polyalkylene oxide or a hydroxyl-terminated polyester (polyester polyol), in the presence of a diisocyanate. R can generally be selected from any aromatic or alphatic group. Examples of potential diisocyanates include toluene dissocyanate and hexamethylene diisocyanate. It is also possible to use an isocyanate in combination with a diamine in the reaction.

The present polyurethane polycondensations may proceed as generally known in the art. For example, the reaction can proceed in solvents such a chlorinated hydrocarbons. Alternatively, the diol or polyol may act as the solvent. The reaction can take place at room temperature in the presence of a catalyst such as dibutyl tin dilaurate or stannous octoate. Water should be excluded from the reaction unless foaming is desired.

Figure 8B:
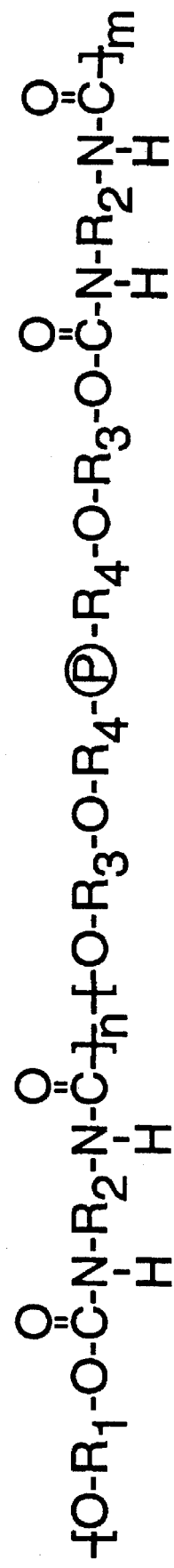
FIG. 8b is a schematic representation of a general formula of a protein-containing polyurethane.

A preferred general formula for protein-containing polyurethanes is given in FIG. 8b. In this figure, $R_1$ preferably represents an alkylene oxide or polyester group resulting from the presence of the polyol in the reaction mixture. In FIG. 8b, n can be 0 if no polyol is used in the reaction. Preferably, however, m<<n to result in a relatively low weight percent of modified protein (i.e., an excess of comonomer(s) is used). In this manner, the physical properties of the polyurethane are predetermined (i.e., they will be substantially identical to the polymer resulting when m=0).

In FIG. 8b, $R_1$ and $R_2$ may represents generally any aromatic or alphatic group. $R_2$ may be a urea group when diamines are used in the reaction mixture. $R_3$ represents the modifying moiety, while $R_4$ represents a linking group connecting the modifying moiety to the protein (see e.g., FIG. 1).

2. Polyesters

Figure 9A:
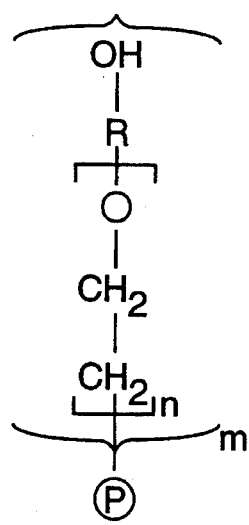
FIG. 9a is a representative illustration of a typical condensation polymerization of a protein-containing polyester.
Figure 9A:
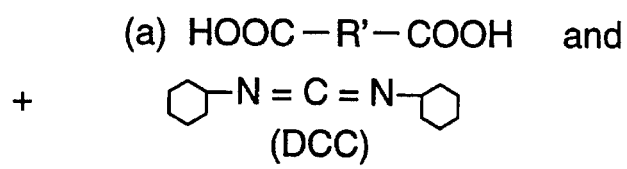
Figure 9A:
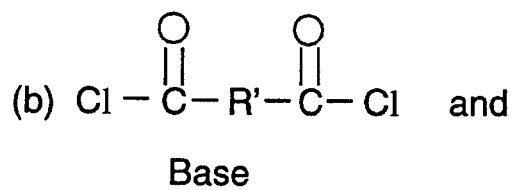
Figure 9A:
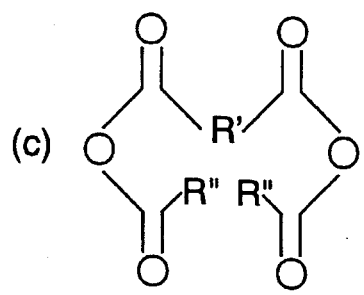
Figure 9A:
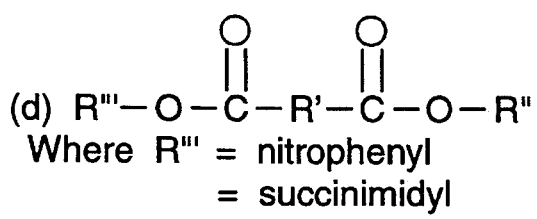
Figure 9A:
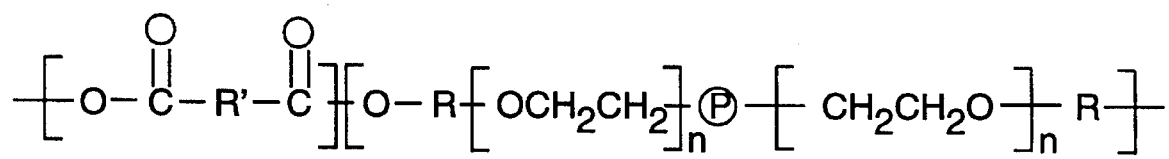

In FIG. 9a, a typical synthesis of a protein-containing polyester under the present invention is illustrated. Generally, the polycondensation proceeds as known in the art. In FIG. 9a, a modified protein is reacted with one of (a), (b), (c) or (d) to result in a protein-containing polyester. A diol, including a polyol, can also be used as a reactant. When a dicarboxylic acid such as (a) is used, a water scavenger such as DCC is preferably used to drive the reaction towards equilibrium. When a reactant such as (b) is used, a base is included as a HCl scavenger to drive the reaction towards equilibrium. In FIG. 9a, R and R' can generally be selected from any alphatic or aromatic group.

Figure 9B:
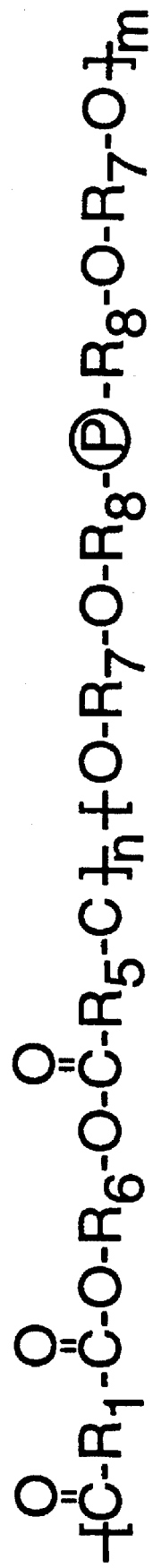
FIG. 9b is a schematic representation of a general formula of a protein-containing polyester.

A preferred general formula of a protein-containing polyester is illustrated in FIG. 9b. In this formula, $R_5$ and $R_6$ can be any alphatic or aromatic group. If no diol is used as a reactant, the ester linkages incorporating $R_6$ will not be present. $R_7$ represents the modifying moiety, and $R_8$ represents a linking group used to link the modifying moiety to the protein.

3. Polyamide

Figure 10A:
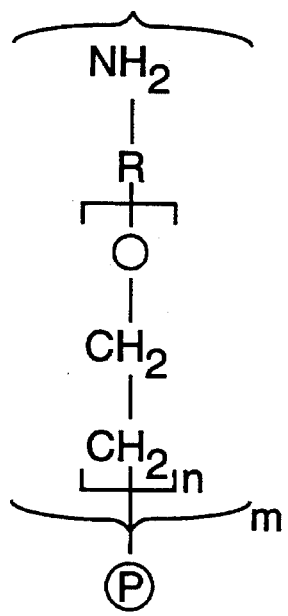
FIG. 10a is a representative illustration of a typical condensation polymerization of a protein-containing polyamide.
Figure 10A:
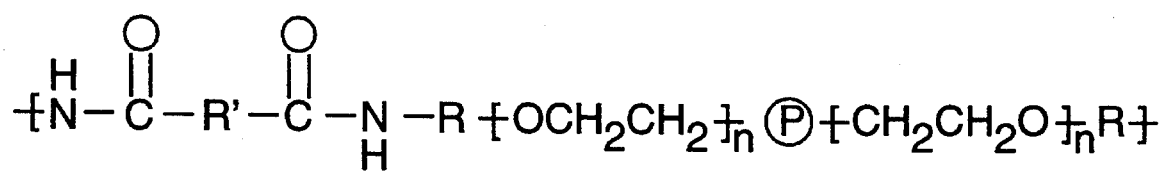

FIG. 10a provides a typical reaction scheme for synthesis of a protein-containing polyamide under the present invention. In this reaction an amino functional modified protein may be reacted with one of reactants (a), (b), (c) or (d) as set forth in FIG. 9(a). A diamine may also be included in the reactants.

Figure 10B:
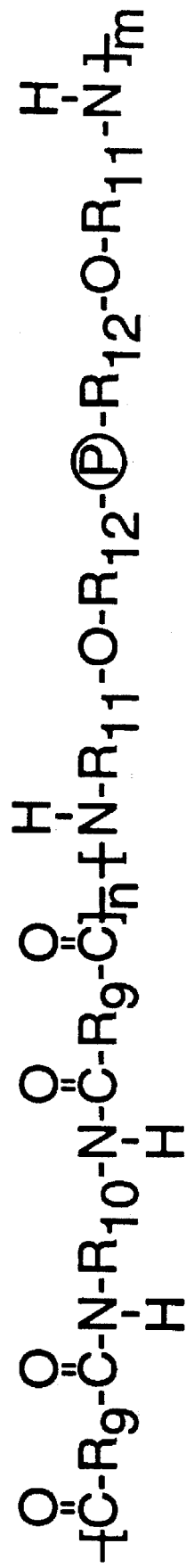
FIG. 10b is a schematic representation of a general formula of a protein-containing polyamide.

A preferred general formula for a protein-containing polyamide is provided in FIG. 10b. In FIG. 10b, $R_9$ and $R_{10}$ can be any aromatic or alphatic group. If no diamine is used as a reactant, the aminde linkages incorporating $R_{10}$ will not be present. $R_{11}$ represents the modifying moiety and $R_{12}$ represents the linking group. $R_9$ and $R_{10}$ may be chosen as known in the art to achieve desired physical properties.

4. Polyureas

Figure 11A:
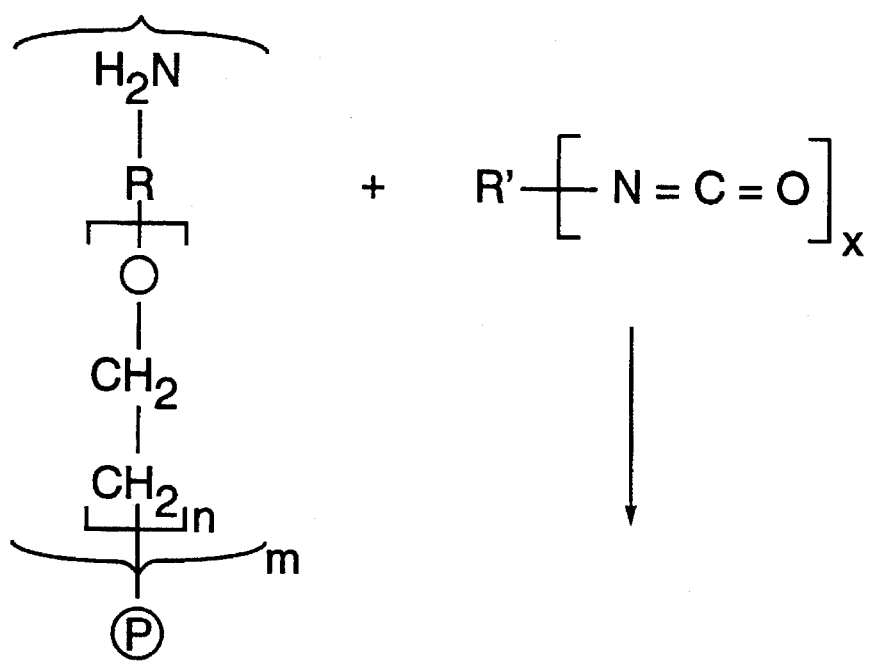
FIG. 11a is a representative illustration of a typical condensation polymerization of a protein-containing polyurea.
Figure 11A:
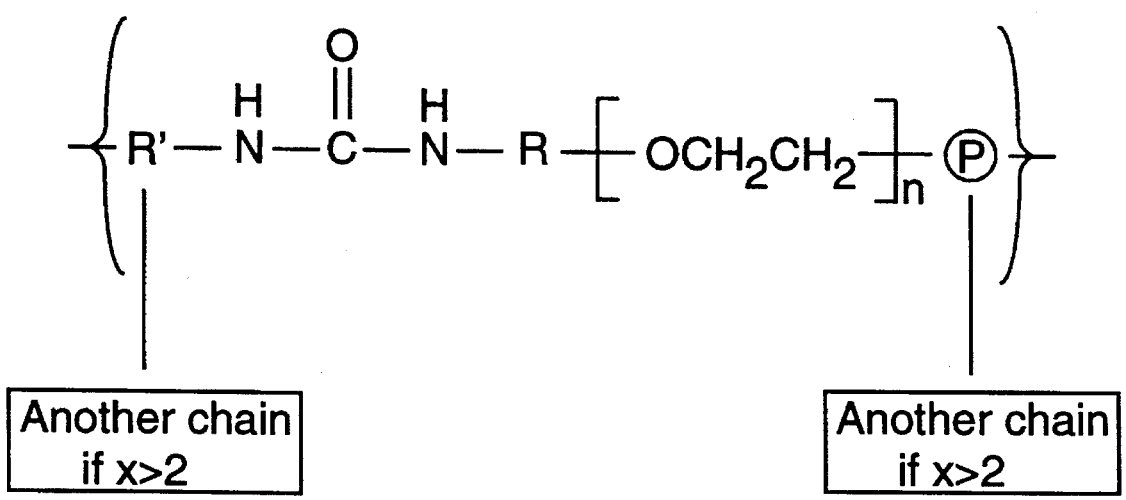

A typical synthesis of a protein-containing polyurea is illustrated in FIG. 11a. In general, the polyurea may be produced by the reaction of a diamine and a dissocyanate. In FIG. 11a, a protein-containing diamine is shown to be reacted with a dissocyanate. Preferably, protein content is maintained relatively low by the inclusion of non-protein-containing diamines in the reaction mixture. Virtually any diamines can be used.

Figure 11B:
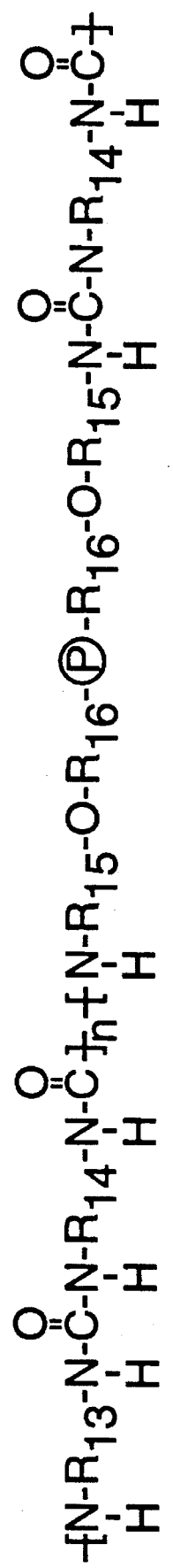
FIG. 11b is a schematic representation of a general formula of a protein-containing polyurea.

A preferred general formula for a protein-containing polyurea is provided in FIG. 11b. In this formula, $R_{13}$ and $R_{14}$ can be any aromatic or alphatic group. $R_{13}$ corresponds to such an alyphatic or aromatic group present in a diamine reactant. $R_{15}$ is the modifying moiety and $R_{16}$ is the linking group.

Although the invention has been described in detail for the purposes of illustration, it is to be understood that such detail is solely for that purpose and that variations can be made therein by those skilled in the art without departing from the scope of the invention except as it may be limited by the claims.

What is claimed is:

1. A water-insoluble copolymer comprising a biologically active protein attached to an organic-soluble comonomer via a spacer group, the spacer group having a number average molecular weight of at least 200, the spacer group being attached to the biologically active protein prior to polymerization with the comonomer to create a protein/spacer group conjugate, the spacer group being selected to prevent precipitation of the protein/spacer group out of an organic solvent in which the polymerization takes place, while maintaining the biological activity and the stability of the protein during polymerization of the protein/spacer group with the comonomer in the organic solvent.

2. The water-insoluble copolymer of claim 1 wherein the modifying moiety comprises a polymer having a number average molecular weight in the range of approximately 200 to 10,000.

3. The water-insoluble copolymer of claim 2 wherein the modifying moiety comprises a polyalkylene oxide.

4. The water-insoluble copolymer of claim 2, wherein the modifying moiety is functionalized with a vinyl functional group prior to copolymerization to enable free-radical addition polymerization with the organic-soluble comonomer.

5. The water-insoluble copolymer of claim 4, wherein the vinyl functional group is selected from the group consisting of an acrylate and an acrylamide.

6. The water-insoluble copolymer of claim 2, wherein the modifying moiety is functionalized prior to polymerization with a functional group selected to enable condensation polymerization with the organic-soluble comonomer.

7. The water-insoluble copolymer of claim 6 wherein the functional group is selected from an amino group, a hydroxyl group and a carboxyl group.

8. The water-insoluble copolymer of claim 4, wherein the copolymer is selected from the group consisting of methyl methacrylate, methyl acrylate, butyl methacrylate, hydroxy ethyl methacrylate, styrene, alpha-methyl styrene, vinyl chloride, vinyl acetate and vinyl pyrollidone.

9. The water-insoluble copolymer of claim 8, wherein the copolymer is selected from the group consisting of methyl methacrylate, methyl acrylate, butyl methacrylate or hydroxy ethyl methacrylate.

10. The water-insoluble copolymer of claim 1, wherein the organic solvent is selected from the group consisting of chloroform, tetrahydrofuran, methanol, carbon tetrachloride, methylene chloride, toluene benzene, alkanes, fluoroform, dioxanes, ethanol, dimethyl formamide, diethyl ether and carbon dioxide.

11. The water-insoluble copolymer of claim 1, wherein the modified protein is present in a weight percent of less than or equal to 5 percent.

12. The water-insoluble copolymer of claim 1, wherein the modified protein is present in a weight percent of less than or equal to 2 percent.

13. The water-insoluble copolymer of claim 1, wherein the protein is an enzyme and the modifying moiety is chosen to retain enzymatic activity in the organic solvent.

14. The water-insoluble copolymer of claim 13, wherein the modified enzyme is present in a weight percent of less than or equal to 5 percent.

15. The water-insoluble copolymer of claim 13, wherein the modified enzyme is present in a weight percent of less than or equal to 2 percent.

16. The water-insoluble copolymer of claim 3, wherein the modifying moiety is a polyethylene glycol derivative.

17. A method of synthesizing a copolymer incorporating a biologically active protein comprising the step of reacting in an organic solvent at least one organic-soluble comonomer with a protein/spacer group conjugate, the protein/spacer group comprising a protein attached to a spacer group, the spacer group having a number average molecular weight of at least 200, the spacer group being selected to prevent precipitation of the protein/spacer group out of the organic solvent while maintaining the biological activity and the stability of the protein during polymerization of the protein/spacer group with the comonomer in the organic solvent, the spacer group being functionalized to react with the organic-soluble comonomer.

18. The method of synthesizing a copolymer incorporating a biologically active protein of claim 17 wherein the modifying moiety comprises a polymer having a number average molecular weight in the range of approximately 200 to 10,000.

19. The method of synthesizing a copolymer incorporating a biologically active protein of claim 18, wherein the modifying moiety is functionalized with a vinyl functional group to enable free-radical addition polymerization with the organic-soluble comonomer.

20. The method of synthesizing a copolymer incorporating a biologically active protein of claim 19, wherein the vinyl functional group is selected from the group consisting of an acrylate and an acrylamide.

21. The method of synthesizing a copolymer incorporating a biologically active protein of claim 18, wherein the modifying moiety is functionalized with a functional group selected to enable condensation polymerization with the organic-soluble comonomer.

22. The method of synthesizing a copolymer incorporating a biologically active protein of claim 21, wherein the functional group is selected from an amino group, a hydroxyl group and a carboxyl group.

23. The method of synthesizing a copolymer incorporating a biologically active protein of claim 18, wherein the modifying moiety comprises a polyalkylene oxide.

24. The method of synthesizing a copolymer incorporating a biologically active protein of claim 19, wherein the copolymer is s elected from the group consisting of methyl methacrylate, methyl acrylate, butyl methacrylate, hydroxy ethyl methacrylate, styrene, alpha-methyl styrene, vinyl chloride, vinyl acetate and vinyl pyrollidone.

25. The method of synthesizing a copolymer incorporating a biologically active protein of claim 24, wherein the copolymer is selected from the group consisting of methyl methacrylate, methyl acrylate, butyl methacrylate or hydroxy ethyl methacrylate.

26. The method of synthesizing a copolymer incorporating a biologically active protein of claim 18, wherein the organic solvent is selected from the group consisting of chloroform, tetrahydrofuran, methanol, carbon tetrachloride, methylene chloride, toluene benzene, alkanes, fluoroform, dioxanes, ethanol, dimethyl formamide, diethyl ether and carbon dioxide.

27. The method of synthesizing a copolymer incorporating a biologically active protein of claim 17, wherein the modified protein is present in a weight percent of less than or equal to 5 percent.

28. The method of synthesizing a copolymer incorporating a biologically active protein of claim 17, wherein the modified protein is present in a weight percent of less than or equal to 2 percent.

29. A method of synthesizing a copolymer incorporating a biologically active protein of claim 17, wherein the protein is an enzyme and the modifying moiety is chosen to retain enzymatic activity in the organic solvent.

30. The method of synthesizing a copolymer incorporating a biologically active protein of claim 29, wherein the modified enzyme is present in a weight percent of less than or equal to 5 percent.

31. The method of synthesizing a copolymer incorporating a biologically active protein of claim 29, wherein the modified enzyme is present in a weight percent of less than or equal to 2 percent.

32. The method of synthesizing a copolymer incorporating a biologically active protein of claim 23 wherein the polyalkylene oxide is a polyethylene glycol derivative.

33. The method of synthesizing a copolymer incorporating a biologically active protein of claim 27, wherein the copolymer is a porous bead.

34. The method of synthesizing a copolymer incorporating a biologically active protein of claim 27, wherein the copolymer is a film.

35. The method of synthesizing a copolymer incorporating a biologically active protein of claim 27, wherein the copolymer is a fiber.

* * * * *